(12) United States Patent
Huang et al.

(10) Patent No.: US 12,349,123 B2
(45) Date of Patent: Jul. 1, 2025

(54) DYNAMIC BUNDLING FOR FEEDBACK

(71) Applicant: QUALCOMM Incorporated, San Diego, CA (US)

(72) Inventors: Yi Huang, San Diego, CA (US); Wanshi Chen, San Diego, CA (US); Peter Gaal, San Diego, CA (US); Tingfang Ji, San Diego, CA (US); Hwan Joon Kwon, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 249 days.

(21) Appl. No.: 17/327,370

(22) Filed: May 21, 2021

(65) Prior Publication Data

US 2022/0046668 A1    Feb. 10, 2022

Related U.S. Application Data

(60) Provisional application No. 63/062,849, filed on Aug. 7, 2020.

(51) Int. Cl.
*H04W 72/23* (2023.01)
*H04W 72/1268* (2023.01)

(52) U.S. Cl.
CPC ....... *H04W 72/1268* (2013.01); *H04W 72/23* (2023.01)

(58) Field of Classification Search
CPC .......................... H04W 72/1268; H04W 72/23
See application file for complete search history.

(56) References Cited

U.S. PATENT DOCUMENTS

| 2019/0081762 | A1* | 3/2019 | Yang | H04L 1/1812 |
| 2019/0306841 | A1* | 10/2019 | Huang | H04L 5/0055 |
| 2019/0393990 | A1* | 12/2019 | Wong | H04L 1/1854 |
| 2021/0037534 | A1* | 2/2021 | Ji | H04L 5/0048 |
| 2021/0084647 | A1* | 3/2021 | Takeda | H04L 1/1896 |
| 2021/0195628 | A1* | 6/2021 | Lin | H04L 1/1854 |

FOREIGN PATENT DOCUMENTS

| WO | WO-2018022560 A1 * | 2/2018 | ........... H04L 5/0053 |
| WO | WO-2018145074 A1 * | 8/2018 | ............... H04L 1/08 |

OTHER PUBLICATIONS

LTE; Evolved Universal Terrestrial Radio Access (E-UTRA); Physical layer procedures, Technical Specification), TS 136 213-V14.2.0, available at https://www.etsi.org/deliver/etsi_ts/136200_136299/136213/14.02.00_60/ts_136213v140200p.pdf, p. 209 (Year: 2017).*

* cited by examiner

*Primary Examiner* — Marcus Smith
*Assistant Examiner* — Zhaohui Yang
(74) *Attorney, Agent, or Firm* — Holland & Hart LLP/Qualcomm

(57) ABSTRACT

Methods, systems, and devices for wireless communications are described. A user equipment (UE) may receive, from a base station, a downlink control information message including an indicator that dynamically indicates bundling of one or more feedback messages. The UE may determine a bundled feedback based on the indicator. In some examples, the UE may determine the bundled feedback from a set of feedback messages corresponding to a set of downlink data messages. The bundled feedback may include fewer feedback bits than a number of feedback bits included in the set of feedback messages. The UE may then transmit the bundled feedback based on bundling being enabled by the indicator.

30 Claims, 16 Drawing Sheets

DYNAMIC BUNDLING FOR FEEDBACK

CROSS REFERENCE

The present application for patent claims the benefit of U.S. Provisional Patent Application No. 63/062,849 by HUANG et al., entitled "DYNAMIC BUNDLING FOR FEEDBACK," filed Aug. 7, 2020, assigned to the assignee hereof, and expressly incorporated by reference herein.

FIELD OF TECHNOLOGY

The following relates to wireless communications, including dynamic bundling for feedback.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). Some wireless communications systems (for example, New Radio (NR) systems), may support high throughput and low latency communications. Some techniques for feedback in systems supporting high throughput and low latency communications, however, may be deficient in some implementations.

SUMMARY

The described techniques relate to improved methods, systems, devices, and apparatuses that support dynamic bundling for feedback. Generally, the described techniques provide for enhancing reliability in communication links in wireless communications systems. According to one or more aspects of the present disclosure, dynamic bundling indicator may be provided in which a user equipment (UE) may transmit a bundled acknowledgment feedback (e.g., hybrid automatic repeat request (HARD) feedback) to a base station for a set of downlink transmissions. In some examples, the UE may determine to bundle a set of feedback bits for the set of downlink transmissions based on receiving a dynamic bundling indicator from a base station. In some examples, the UE may receive a set of downlink data messages and may determine a feedback message (e.g., a feedback bit) for each of the downlink data messages. Upon receiving a bundling indicator enabling bundling of one or more feedback messages, the UE may determine a bundled feedback for the set of downlink data messages and may transmit the bundled feedback to the base station.

A method of wireless communication at a UE is described. The method may include receiving, from a base station, a downlink control information (DCI) message including an indicator that dynamically indicates bundling of one or more feedback messages, determining, based on the indicator, a bundled feedback from a set of feedback messages corresponding to a set of downlink data messages, the bundled feedback including fewer feedback bits than a number of feedback bits included in the set of feedback messages, and transmitting the bundled feedback based on bundling being enabled by the indicator.

An apparatus for wireless communication at a UE is described. The apparatus may include a processor, memory coupled with the processor, and instructions stored in the memory. The instructions may be executable by the processor to cause the apparatus to receive, from a base station, a DCI message including an indicator that dynamically indicates bundling of one or more feedback messages, determine, based on the indicator, a bundled feedback from a set of feedback messages corresponding to a set of downlink data messages, the bundled feedback including fewer feedback bits than a number of feedback bits included in the set of feedback messages, and transmit the bundled feedback based on bundling being enabled by the indicator.

Another apparatus for wireless communication at a UE is described. The apparatus may include means for receiving, from a base station, a DCI message including an indicator that dynamically indicates bundling of one or more feedback messages, determining, based on the indicator, a bundled feedback from a set of feedback messages corresponding to a set of downlink data messages, the bundled feedback including fewer feedback bits than a number of feedback bits included in the set of feedback messages, and transmitting the bundled feedback based on bundling being enabled by the indicator.

A non-transitory computer-readable medium storing code for wireless communication at a UE is described. The code may include instructions executable by a processor to receive, from a base station, a DCI message including an indicator that dynamically indicates bundling of one or more feedback messages, determine, based on the indicator, a bundled feedback from a set of feedback messages corresponding to a set of downlink data messages, the bundled feedback including fewer feedback bits than a number of feedback bits included in the set of feedback messages, and transmit the bundled feedback based on bundling being enabled by the indicator.

In some examples of the method, apparatuses, and non-transitory computer-readable medium described herein, receiving the DCI message including the indicator further may include operations, features, means, or instructions for receiving, from the base station, a set of DCI messages, and determining whether bundling may be enabled based on the indicator included in a last-received DCI message of the set of DCI messages.

Some examples of the method, apparatuses, and non-transitory computer-readable medium described herein may further include operations, features, means, or instructions for identifying a transmission time period allocated for transmission of the bundled feedback, and identifying a lookback time window that extends from the transmission time period to a prior time period, where the bundled feedback may be for the set of feedback messages that would be transmitted during the lookback time window in an absence of bundling.

In some examples of the method, apparatuses, and non-transitory computer-readable medium described herein, receiving the DCI message including the indicator further may include operations, features, means, or instructions for receiving, from the base station, the DCI message including an indication to activate a sub-slot granularity, and identifying a granularity of the lookback time window based on the activated sub-slot granularity.

Some examples of the method, apparatuses, and non-transitory computer-readable medium described herein may further include operations, features, means, or instructions for determining that bundling may be enabled until receiving a second DCI message including an indication to deactivate the sub-slot granularity.

In some examples of the method, apparatuses, and non-transitory computer-readable medium described herein, a size of the lookback time window may be proportional to the activated sub-slot granularity. In some examples of the method, apparatuses, and non-transitory computer-readable medium described herein, the sub-slot granularity includes a two orthogonal frequency division multiplexing symbol sub-slot granularity or a seven orthogonal frequency division multiplexing symbol sub-slot granularity.

Some examples of the method, apparatuses, and non-transitory computer-readable medium described herein may further include operations, features, means, or instructions for performing a logical operation on the set of feedback messages to generate the bundled feedback. In some examples of the method, apparatuses, and non-transitory computer-readable medium described herein, the logical operation includes an AND operation.

Some examples of the method, apparatuses, and non-transitory computer-readable medium described herein may further include operations, features, means, or instructions for receiving, from the base station, a second DCI message including an indication that disables bundling of the one or more feedback messages, and disabling bundling of the one or more feedback messages based on the indication.

In some examples of the method, apparatuses, and non-transitory computer-readable medium described herein, the bundled feedback includes one feedback bit. In some examples of the method, apparatuses, and non-transitory computer-readable medium described herein, the indicator includes one bit.

In some examples of the method, apparatuses, and non-transitory computer readable medium described herein, the bundled feedback may include a HARQ feedback for the plurality of downlink data messages.

A method of wireless communication at a base station is described. The method may include transmitting, to a UE, a DCI message including an indicator that dynamically indicates bundling of one or more feedback messages, transmitting, to the UE, a set of downlink data messages, and receiving, from the UE, a bundled feedback corresponding to a set of feedback messages for the set of downlink data messages based on bundling being enabled by the indicator, the bundled feedback including fewer feedback bits than a number of feedback bits included in the set of feedback messages.

An apparatus for wireless communication at a base station is described. The apparatus may include a processor, memory coupled with the processor, and instructions stored in the memory. The instructions may be executable by the processor to cause the apparatus to transmit, to a UE, a DCI message including an indicator that dynamically indicates bundling of one or more feedback messages, transmit, to the UE, a set of downlink data messages, and receive, from the UE, a bundled feedback corresponding to the set of downlink data messages based on bundling being enabled by the indicator, the bundled feedback including fewer feedback bits than a number of feedback bits included in the set of feedback messages.

Another apparatus for wireless communication at a base station is described. The apparatus may include means for transmitting, to a UE, a DCI message including an indicator that dynamically indicates bundling of one or more feedback messages, transmitting, to the UE, a set of downlink data messages, and receiving, from the UE, a bundled feedback corresponding to a set of feedback messages for the set of downlink data messages based on bundling being enabled by the indicator, the bundled feedback including fewer feedback bits than a number of feedback bits included in the set of feedback messages.

A non-transitory computer-readable medium storing code for wireless communication at a base station is described. The code may include instructions executable by a processor to transmit, to a UE, a DCI message including an indicator that dynamically indicates bundling of one or more feedback messages, transmit, to the UE, a set of downlink data messages, and receive, from the UE, a bundled feedback corresponding to the set of downlink data messages based on bundling being enabled by the indicator, the bundled feedback including fewer feedback bits than a number of feedback bits included in the set of feedback messages.

Some examples of the method, apparatuses, and non-transitory computer-readable medium described herein may further include operations, features, means, or instructions for identifying a transmission time period allocated for transmission of the bundled feedback, and identifying a lookback time window that extends from the transmission time period to a prior time period, where the bundled feedback may be for the set of feedback messages that would be transmitted during the lookback time window in the absence of bundling.

In some examples of the method, apparatuses, and non-transitory computer-readable medium described herein, transmitting the DCI message including the indicator further may include operations, features, or instructions for transmitting, to the UE, the DCI message including an indication to activate a sub-slot granularity, where a granularity of the lookback time window may be based on the activated sub-slot granularity.

In some examples of the method, apparatuses, and non-transitory computer-readable medium described herein, a size of the lookback time window may be proportional to the activated sub-slot granularity. In some examples of the method, apparatuses, and non-transitory computer-readable medium described herein, the sub-slot granularity includes a two orthogonal frequency division multiplexing symbol sub-slot granularity or a seven orthogonal frequency division multiplexing symbol sub-slot granularity.

In some examples of the method, apparatuses, and non-transitory computer-readable medium described herein, the bundled feedback may be generated based on performing a logical operation on the set of feedback messages. In some examples of the method, apparatuses, and non-transitory computer-readable medium described herein, the logical operation includes an AND operation.

Some examples of the method, apparatuses, and non-transitory computer-readable medium described herein may further include operations, features, means, or instructions for transmitting, to the UE, a second DCI message including an indication that disables bundling of the one or more feedback messages.

In some examples of the method, apparatuses, and non-transitory computer-readable medium described herein, the bundled feedback includes one feedback bit. In some examples of the method, apparatuses, and non-transitory computer-readable medium described herein, the indicator includes one bit.

In some examples of the method, apparatuses, and non-transitory computer readable medium described herein, the bundled feedback may include a HARQ feedback for the plurality of downlink data messages.

DETAILED DESCRIPTION

Figure 1:
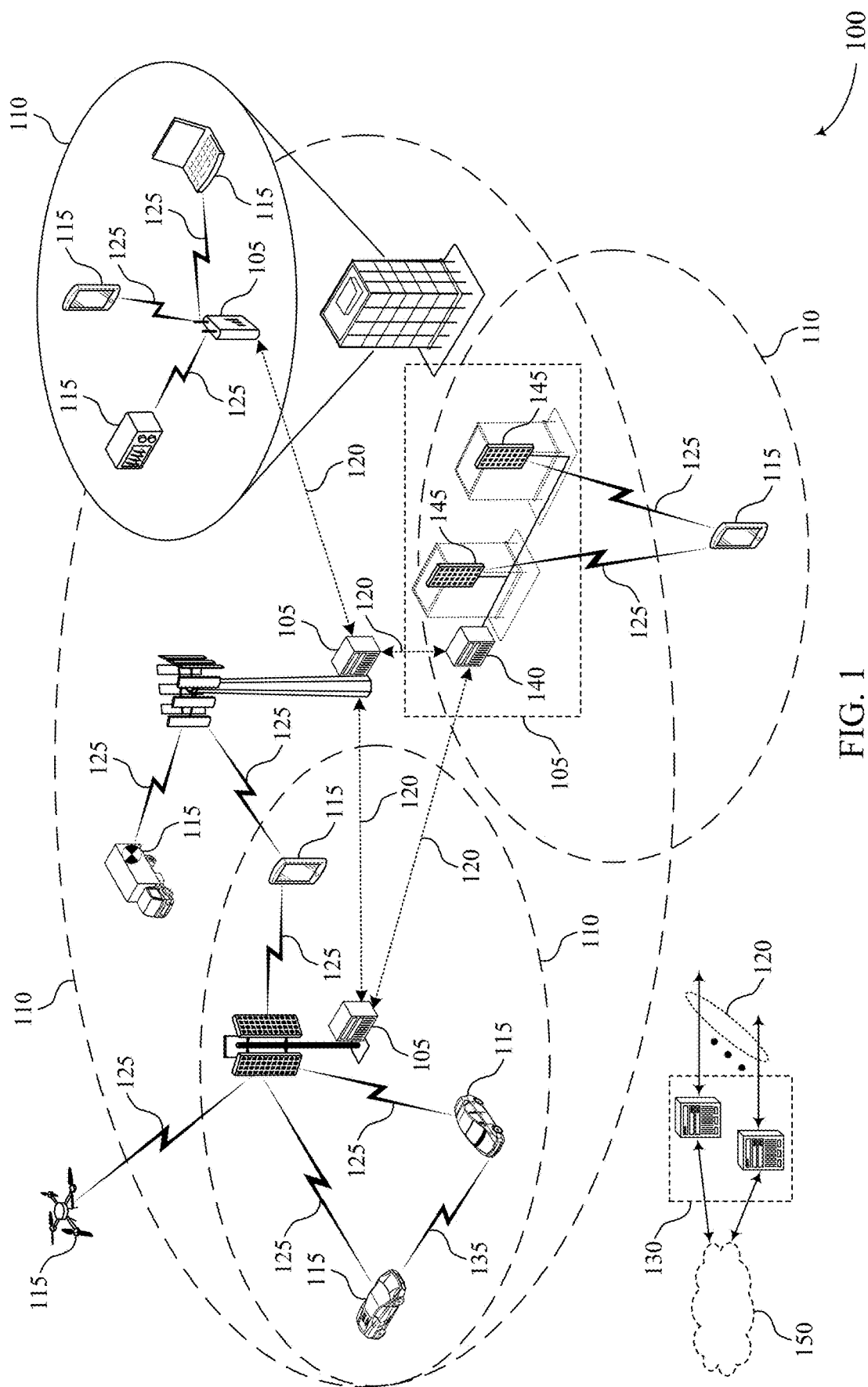
FIGS. 1 and 2 illustrate examples of a wireless communications system that supports dynamic bundling for feedback in accordance with aspects of the present disclosure.

Some wireless communication systems may include communication devices, such as user equipments (UEs) and base stations, for example, eNodeBs (eNBs), next-generation NodeBs or giga-NodeBs (either of which may be referred to as a gNB) that may support multiple radio access technologies. Examples of radio access technologies include fourth generation (4G) systems such as Long Term Evolution (LTE) systems and fifth generation (5G) systems which may be referred to as New Radio (NR) systems. The communication devices may, in some examples, support one or more of the above example radio access technologies. A UE in a wireless communications system, such as an NR system or an LTE system, may support applications associated with high throughput and low latency. The described aspects of the disclosure relate to improved methods, systems, devices, or apparatuses that facilitate an improved feedback scheme for transmissions or retransmissions, such as bundled hybrid automatic repeat request (HARQ) acknowledgment/negative-acknowledgment (ACK/NACK) feedback. In some examples, the techniques described herein enable use of a bundling indicator to indicate to a UE to provide bundled feedback for one or more downlink transmissions According to one or more aspects, a UE may receive a downlink control information (DCI) message that includes a bundling indicator. In some examples, a base station may configure the bundling indicator to dynamically indicates bundling of one or more feedback messages. Upon receiving the bundling indicator, the UE may determine a bundled feedback from a set of feedback messages corresponding to a set of downlink data messages. For example, the UE may receive multiple downlink data messages and may determine a feedback bit based on a successful or unsuccessful decoding of each of the downlink data messages. In some examples, the bundled feedback may include fewer feedback bits than a number of feedback bits included in the set of feedback messages. The UE may then transmit the bundled feedback based on bundling being enabled by the bundling indicator. In some examples, the bundled feedback may include a HARQ feedback.

UEs capable of supporting bundling indicator for high priority and low latency communications may utilize the techniques described herein to experience power savings, such as reduced power consumption and extended battery life while ensuring reliable and efficient communications between UEs and base stations. Particular aspects of the subject matter described in this disclosure may be implemented to realize one or more of the following potential advantages. The techniques employed by the described UEs may provide benefits and enhancements to the operation of the UEs. For example, operations performed by the UEs may provide improvements to wireless operations. In some examples, the UEs may support high reliability and low latency communications, among other examples, in accordance with aspects of the present disclosure. The described techniques may thus include features for improvements to power consumption, spectral efficiency, higher data rates, and in some examples, may promote enhanced efficiency for high reliability and low latency operations, among other benefits.

Aspects of the disclosure are initially described in the context of wireless communications systems. Aspects of the disclosure are further described in the context of feedback transmission scheme and process flow. Aspects of the disclosure are further illustrated by and described with reference to apparatus diagrams, system diagrams, and flowcharts that relate to dynamic bundling for feedback.

FIG. 1 illustrates an example of a wireless communications system 100 that supports dynamic bundling for feedback in accordance with aspects of the present disclosure. The wireless communications system 100 may include one or more base stations 105, one or more UEs 115, and a core network 130. In some examples, the wireless communications system 100 may be an LTE network, an LTE-Advanced (LTE-A) network, an LTE-A Pro network, or an NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNB, a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The network operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 MHz to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. HARQ feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Some wireless communications systems allow for different communication configurations corresponding to different sub-slot granularities. For example, wireless communications systems may support a 2 OFDM symbol sub-slot granularity and a 7 OFDM symbol sub-slot granularity. The different sub-slot communications are configured via RRC messaging, and a base station 105 may dynamically switch between the different sub-slot communication configurations via dynamic signaling. A base station 105 may configure a UE 115 to report feedback (for example, HARQ feedback) either in individual feedback bits corresponding to each downlink data message or as a bundled message. Feedback bundling involves the logical combining of individual feedback bits into a fewer number of bits (including, for example, a single bit). In some examples, a UE 115 may adjust its operations in order to improve reliability of communications. In some examples, a base station 105 may configure a UE 115 or the UE 115 may otherwise transition from a 2 OFDM symbol sub-slot granularity to a 7 OFDM symbol sub-slot granularity.

According to one or more aspects of the present disclosure, to efficiently provide feedback, a base station 105 may dynamically indicate that the UE 115 should transition from an individual feedback scheme to a bundled feedback scheme. In some examples, the base station 105 may dynamically indicate a bundling indicator to the UE 115. The base station 105 may transmit the bundling indicator in addition with an indication for the UE 115 to switch from a first sub-slot granularity to a second sub-slot granularity. Upon receiving the dynamic bundling indication, the UE 115 may bundle multiple feedback bits (e.g., for multiple downlink data messages) into fewer feedback bits (e.g., a single bit). The UE 115 may then transmit the bundled feedback to the base station 105.

Figure 2:
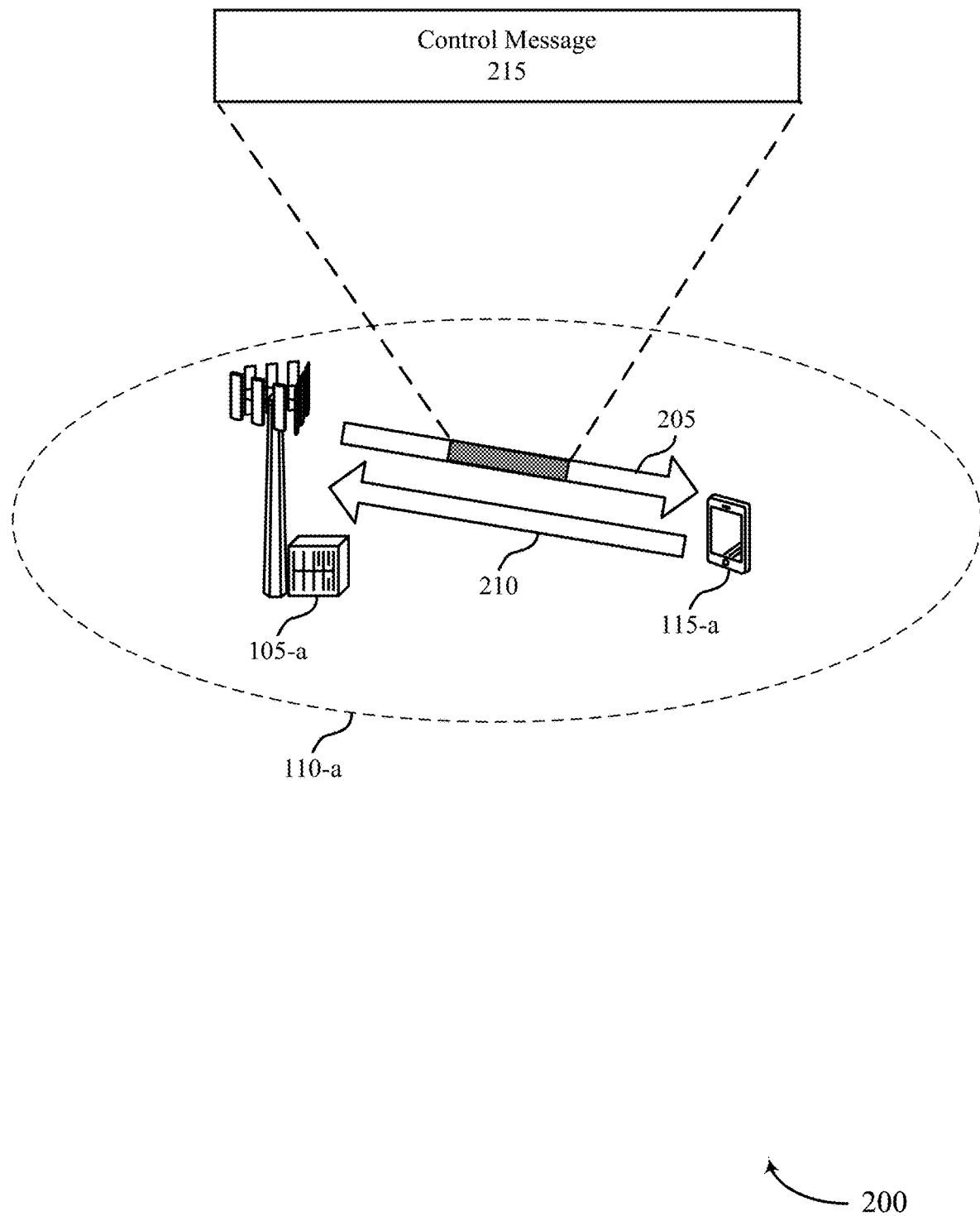

FIG. 2 illustrates an example of a wireless communications system 200 that supports dynamic bundling for feedback in accordance with aspects of the present disclosure. In some examples, the wireless communications system 200 may implement aspects of wireless communications system 100. Wireless communications system 200 includes base station 105-a and UE 115-a, which may be examples of the corresponding devices described with reference to FIG. 1. Base station 105-a may communicate with wireless devices (including UE 115-a) within coverage area 110-a. For example, base station 105-a may transmit downlink signals to UE 115-a on resources of a carrier 205, and UE 115-a may transmit uplink signals to base station 105-a on resources of a second carrier 210. Wireless communications system 200 may support communication between base station 105-a and UE 115-a using various sub-slot granularities, as described with reference to wireless communications system 100. Aspects of the present disclosure provides for various methods of indicating dynamic bundling indicator in wireless communications systems.

In some wireless communications systems (for example, NR wireless systems, such as wireless communications system 200), the UE 115-a and the base station 105-a may support low latency and high throughput communications. UEs 115 and base stations 105 in wireless communications systems may communicate according to one or more time periods (e.g., frame, half-frame, subframe, slot, sub-slot, symbol, etc.). The UEs 115 may be configured to provide a feedback in each time period. In some examples, some wireless communications systems may allow more than one feedback (e.g., HARQ acknowledgment) transmission per uplink slot. For instance, wireless communications systems may support UEs 115 transmitting a feedback (e.g., HARQ acknowledgment) in each sub-slot, which allows faster feedback transmission for low latency communications. In some examples, allowing multiple feedback transmissions in a slot may improve reliability in ultra-reliable low-latency communications. In some examples, a 2 OFDM symbol sub-slot configuration may allow up to seven feedbacks per slot.

In some examples, a UE 115 may transmit one or more feedbacks according to a full slot granularity if sub-slots are not configured. In some cases, a sub-slot based feedback may not allow a feedback for a sub-slot to be transmitted in a following sub-slot. As described herein, wireless communications systems may allow for different communication configurations corresponding to different sub-slot granularities. For example, wireless communications systems may support a 2 OFDM symbol sub-slot granularity and a 7 OFDM symbol sub-slot granularity. In case of a 2 OFDM symbol sub-slot, a physical uplink control channel may include two OFDM symbols. Thus, the energy to transmit a HARQ acknowledgment feedback may be limited by two OFDM symbols, which may reduce the HARQ acknowledgment reliability for a UE located at an edge of a cell or for a handblocked UE (e.g., in mmW wireless communications systems).

In some wireless communications systems, different sub-slot communications may be configured via RRC messaging. For example, two (or more) sets of RRC configurations for ultra-reliable low-latency communications may indicate one or more of sub-slot granularity, K1 interpretation, and physical uplink control channel resource sets configuration. In one example, a base station 105 may choose a 7 OFDM symbol sub-slot granularity for better coverage and reliability, and a 2 OFDM symbol sub-slot granularity for faster feedback timeline. In some instances, a base station 105 may dynamically switch between the different sub-slot communication configurations via dynamic signaling (such as medium access control-control element signaling).

A UE 115 may receive an MAC-control element (MAC-CE) signaling configuring the UE 115 to switch to an updated sub-slot granularity (e.g., from a 2 OFDM symbol sub-slot granularity to a 7 OFDM symbol sub-slot granularity or from a 7 OFDM symbol sub-slot granularity to a 2 OFDM symbol sub-slot granularity) and the UE 115 may transmit a feedback acknowledging receipt of the MAC-CE. After transmitting the feedback, the UE 115 may switch to the updated sub-slot granularity a predefined transition period (e.g., 3 ms) after transmitting the feedback. In such cases, a base station 105 may assume that a UE 115 has successfully switched to the updated sub-slot granularity indicated by the MAC-CE, upon expiration of the transition period after transmission of the feedback. Some wireless communications systems may not allow HARQ acknowledgment to carry over before and after the transition period. In such cases, one or more unsent HARQ acknowledgments associated with a previous sub-slot granularity may be dropped during a feedback opportunity associated with a current sub-slot granularity.

In some examples, a base station 105 may configure a UE 115 to identify a lookback time window that extends from a transmission time period allocated for transmitting feedback to a prior time period. The UE 115 may receive multiple data messages within a lookback time window and may determine a combined feedback for that lookback time window. In some examples, the UE 115 may transmit a combined feedback for multiple physical downlink shared channels included in a lookback time window. For example, the UE 115 may utilize a physical uplink control channel to transmit the combined feedback. In some examples, the lookback time window may be configured by RRC parameters (e.g., dl-DataToUL-ACK or dl-DataToUL-ACKForDCIFormat1_2). In some examples, the lookback time window may be continuous (e.g., {1,2,3,4,5,6,7,8}) or discontinuous (e.g., {1,3,5,7,9,11,13,15}). For example, a continuous lookback time window {1,2,3,4,5,6,7,8} may indicate that the lookback time window extends from the first OFDM symbol to the eight OFDM symbol. A discontinuous lookback time window {1,3,5,7,9,11,13,15} may indicate that the lookback time window includes the 1st OFDM symbol, the 3rd OFDM symbol, the 5th OFDM symbol, the 7th OFDM symbol, the 9th OFDM symbol, the 11th OFDM symbol, the 13th OFDM symbol. and the 15th OFDM symbol. The granularity or unit of the lookback time window may follow the sub-slot granularity.

As described herein, a UE 115 may adjust its operations in order to improve reliability of communications. One method of improving reliability may include transitioning from a 2 OFDM symbol sub-slot granularity to a 7 OFDM symbol sub-slot granularity. This switch, however, may dynamically increase the lookback time window for which feedback is provided (as a feedback lookback time window is associated with the sub-slot granularity used). For example, when a UE 115 switches to a larger sub-slot granularity (e.g., 7 OFDM symbol sub-slot granularity), a size of the lookback time window may scale linearly with the sub-slot granularity. With a larger lookback time window, the UE 115 may provide feedback for a larger number of physical downlink shared channels (more physical downlink shared channels fall into an increased lookback time window), which in turn increases the feedback payload size and reduces the reliability of feedback transmission. That is, a UE may be configured to provide individual feedback responses for messages received during a lookback time window. In some examples, the UE may receive an indication to switch to a different sub-slot granularity. For instance, when the base station dynamically informs the UE to transition from a 2 OFDM symbol sub-slot granularity to a 7 OFDM symbol sub-slot granularity, the lookback time window may become excessively large. In such cases, the base station may benefit from also dynamically indicate that the UE should transition from an individual feedback scheme to a bundled feedback scheme.

As described herein, a base station 105 may configure a UE 115 to report feedback (for example, HARQ feedback) either in individual feedback bits (for example, one bit per message to which the feedback pertains) or as a bundled message. Feedback may be provided for all messages received within a specific lookback time window. In some examples, feedback bundling may be a technique to bundle multiple feedback bits by logical combining of individual feedback bits into a fewer number of bits (including, for example, a single bit). In some wireless communications systems, feedback bundling may be configured via RRC signaling.

According to one or more aspects of the present disclosure, the base station 105-a may transmit a dynamic bundling indication in a DCI message to enable or disable bundling. Additionally or alternatively, when multiple DCI messages each include the dynamic bundling indication, the UE 115-*a* may bundle the feedback according to the most recently received DCI message.

In some examples, the base station 105-*a* may transmit a control message 215 (e.g., a DCI message) including a bundling indicator that dynamically indicates bundling of one or more feedback messages. The bundling indicator may include one bit. In some examples, the bundling indicator may be included in a field in a DCI message (e.g., DCI format 1_2). The UE 115-*a* may receive that bundling indicator and may determine to bundle feedback for multiple data messages received within a time period (e.g., lookback time window). In some examples, the UE 115-*a* may determine, based on the bundling indicator, a bundled feedback from a set of feedback messages corresponding to a set of downlink data messages. In some cases, the bundled feedback may include fewer feedback bits than a number of feedback bits included in the set of feedback messages. In some examples, the bundled feedback may include a HARQ feedback for the plurality of downlink data messages.

According to one or more aspects, the UE 115-*a* may identify a transmission time period allocated for transmission of the bundled feedback. For example, the UE 115-*a* may identify a symbol allocation for uplink control channel transmission. The UE 115-*a* may also identify a lookback time window that extends from the transmission time period to a prior time period. The UE 115-*a* may determine that the bundled feedback is for the set of feedback messages that would be transmitted during the lookback time window in the absence of bundling. In some examples, to increase uplink reliability and coverage, in addition to switching from 2 OFDM symbol sub-slot granularity to 7 OFDM symbol sub-slot granularity, the base station 105-*a* may dynamically enable bundling for some feedback transmissions. In some examples, the UE 115-*a* may receive, from the base station 105-*a*, a DCI message including an indication to activate a sub-slot granularity (e.g., indication to switch from 2 OFDM symbol sub-slot granularity to 7 OFDM symbol sub-slot granularity) and the UE 115-*a* may identify a granularity of the lookback time window based on the activated sub-slot granularity. As described herein, a size of the lookback time window is proportional to the activated sub-slot granularity. In some examples, the UE 115-*a* may determine that bundling is enabled until receiving a second DCI message including an indication to deactivate the sub-slot granularity. In some examples, the UE 115-*a* may generate a bundled feedback based on performing a logical operation on a set of feedback messages (for a set of downlink data messages received during a lookback time window). In some cases, the logical operation may include an AND operation. In some examples, the bundled feedback may include one feedback bit.

According to one or more aspects, multiple DCI messages may schedule multiple physical downlink shared channels with overlapping feedback opportunities (e.g., in the same slot). In such an example, the UE 115-*a* may be configured to transmit the feedback according to the bundle indicator in the most recent DCI message. For example, the UE 115-*a* may receive a set of DCI messages and may determine whether bundling is enabled based on the bundling indicator included in a last-received DCI message of the set of DCI messages.

Additionally or alternatively, the UE 115-*a* may disable bundling of feedback based on receiving a DCI message disabling the bundling indicator. In some examples, the UE 115-*a* may receive, from the base station 105-*a*, a DCI message including an indication that disables bundling of one or more feedback messages. In response to receiving the indication that disables bundling, the UE 115-*a* may disable bundling of the one or more feedback messages.

Figure 3:
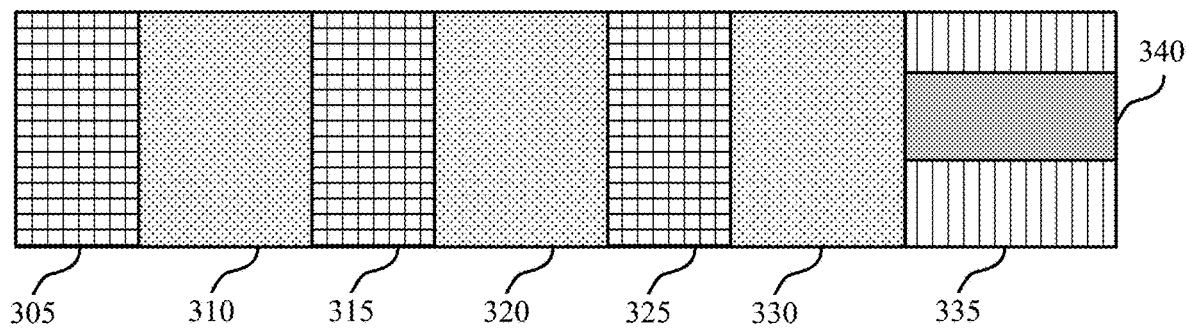
FIG. 3 illustrates an example of a feedback transmission scheme that supports dynamic bundling for feedback in accordance with aspects of the present disclosure.

FIG. 3 illustrates an example of a feedback transmission scheme 300 that supports dynamic bundling for feedback in accordance with aspects of the present disclosure. In some examples, the feedback transmission scheme 300 may implement aspects of wireless communications system 100 and the wireless communications system 200 as described with reference to FIGS. 1 and 2. In some examples, the feedback transmission scheme 300 may be implement by a base station 105 and a UE 115. The base station 105 and the UE 115 may be examples of a base station 105 and a UE 115, as described with reference to FIGS. 1 and 2.

According to one or more aspects of the present disclosure, a base station 105 may transmit a dynamic bundling indication in a DCI message to enable bundling. In the example of FIG. 3 the base station 105 may transmit a bundling indicator in the DCI message 305. The bundling indicator may include one bit. In some examples, the bundling indicator may be included in a field in the DCI message 305. The bundling indicator may enable the UE 115 to bundle a set of feedback messages for a set of downlink data messages. The UE 115 may then receive a downlink data message 310 associated with the DCI message 315. The UE 115 may determine a feedback based on a successful or unsuccessful decoding of the downlink data message 310. The UE 115 may further receive additional DCI messages (e.g., DCI message 315 and DCI message 325). Each DCI message may schedule a corresponding downlink data message. For instance, the DCI message 315 may schedule the downlink data message 320 and the DCI message 325 may schedule the downlink data message 330. In some examples, the UE 115 may calculate a feedback for each of the downlink data message 320 and the downlink data message 320. In some examples, the UE 115 may identify three feedback messages for the downlink data message.

In some examples, the UE 115 may determine, based on the bundling indicator, a bundled feedback 340 from a set of feedback messages corresponding to a set of downlink data messages. For instance, the UE 115 may determine a bundled feedback 340 corresponding to the downlink data message 310, the downlink data message 320, and the downlink data message 330. In some cases, the bundled feedback may include fewer feedback bits than a number of feedback bits included in the set of feedback messages. In some examples, the UE 115 may perform a logical operation (e.g., AND operation) on the set of feedback messages (e.g., feedback messages corresponding to the downlink data message 310, the downlink data message 320, and the downlink data message 330) to determine the bundled feedback 340. The UE 115 may transmit the bundled feedback 340 in an uplink control channel 335 (e.g., during a feedback transmission opportunity).

Additionally or alternatively, when multiple DCI messages each include the dynamic bundling indication, the UE 115-*a* may bundle the feedback according to the most recently received DCI message. For example, the UE 115 may receive a second bundling indicator in the DCI message 325. In such a case, the UE 115 may disregard the bundling indicator received in the DCI message 305 and may instead perform bundling of feedback according to the second bundling indicator received in the DCI message 325.

Figure 4:
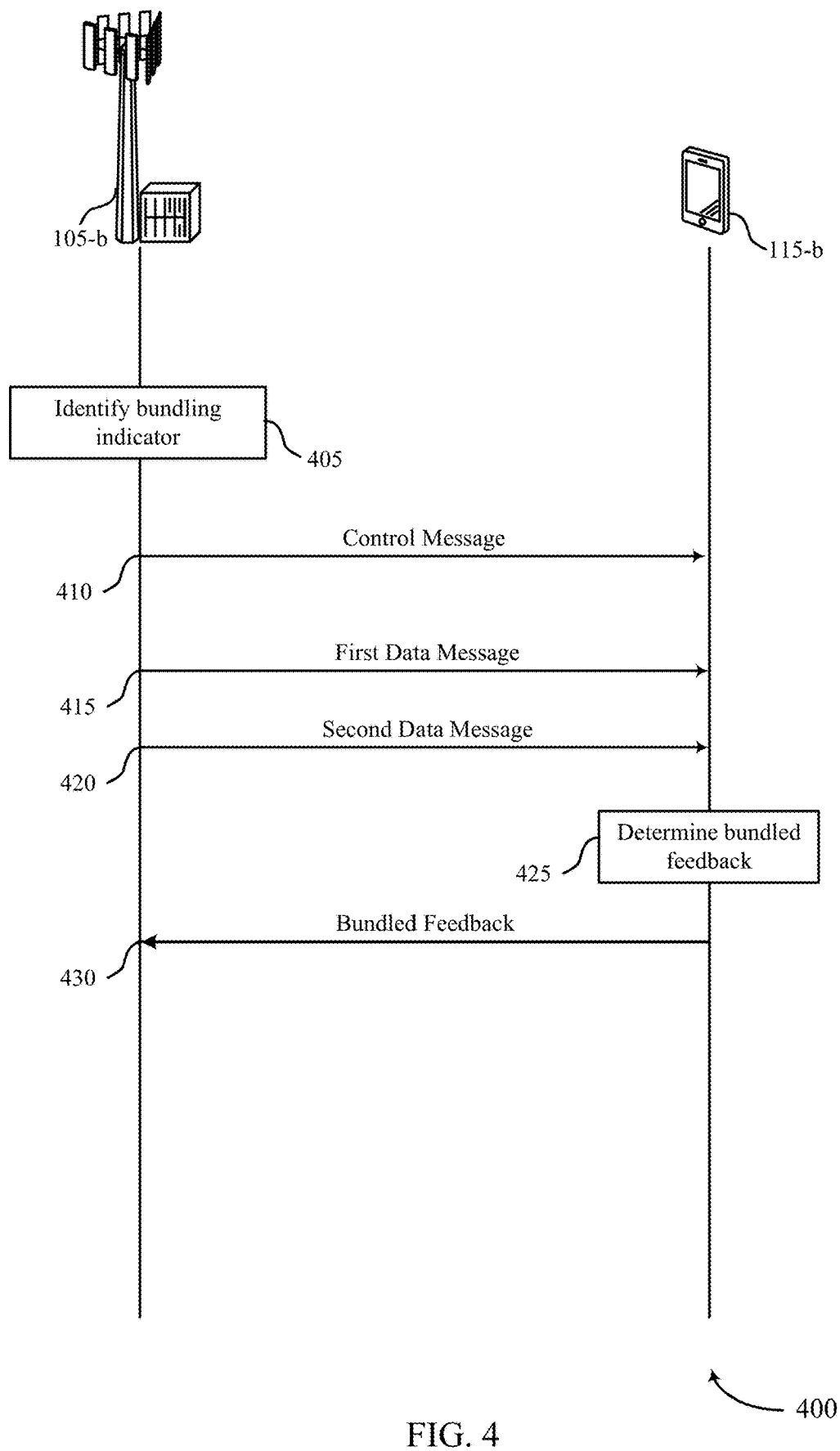
FIG. 4 illustrates an example of a process flow that supports dynamic bundling for feedback in accordance with aspects of the present disclosure.

FIG. 4 illustrates an example of a process flow 400 that supports dynamic bundling for feedback in accordance with aspects of the present disclosure. In some examples, the process flow 400 may implement aspects of wireless communications system 100 and the wireless communications system 200 described with reference to FIGS. 1 and 2, respectively. For example, the process flow 400 may be based on one or more rules for dynamic bundling for feedback in wireless communications systems. The process flow 400 may be implemented by UE 115-*b* and base station 105-*b* for reduced power consumption, and may promote low latency and low interference for wireless communications supporting high priority channels, among other benefits. The base station 105-*b* and the UE 115-*b* may be examples of a base station 105 and a UE 115, as described with reference to FIGS. 1 and 2.

In the following description of the process flow 400, the operations between the base station 105-*b* and the UE 115-*b* may be transmitted in a different order than the example order shown, or the operations performed by the base station 105-*b* and the UE 115-*b* may be performed in different orders or at different times. Some operations may also be omitted from the process flow 400, and other operations may be added to the process flow 400.

At 405, the base station 105-*b* may identify a bundling indicator that dynamically indicates bundling of one or more feedback messages. In some examples, the indicator may include a single bit. At 410, the base station 105-*b* may transmit, to the UE 115-*b*, a DCI message including the bundling indicator that dynamically indicates bundling of the one or more feedback messages.

At 415, the base station 105-*b* may transmit a first downlink data message. At 420, the base station 105-*b* may transmit a second downlink data message. In some examples, the first downlink data message and the second downlink data message may be included within a lookback time window.

At 425, the UE 115-*b* may determine a bundled feedback. For instance, the UE 115-*b* may determine a first feedback message for the first data message received at 415 and a second feedback message for the second data message received at 420. The UE 115-*b* may then perform a logical operation on the first feedback message and the second feedback message to generate a bundled feedback. In some examples, the logical operation may include an AND operation. Thus, the UE 115-*b* may determine a bundled feedback from the first feedback message corresponding to the first data message received at 415 and the second feedback message corresponding to the second data message received at 415. In some cases, the bundled feedback may include fewer feedback bits than a number of feedback bits included in the first feedback message and the second feedback message. At 430, the UE 115-*b* may transmit the bundled feedback based on bundling being enabled by the bundling indicator (e.g., bundling indicator included in the control message received at 410).

Figure 5:
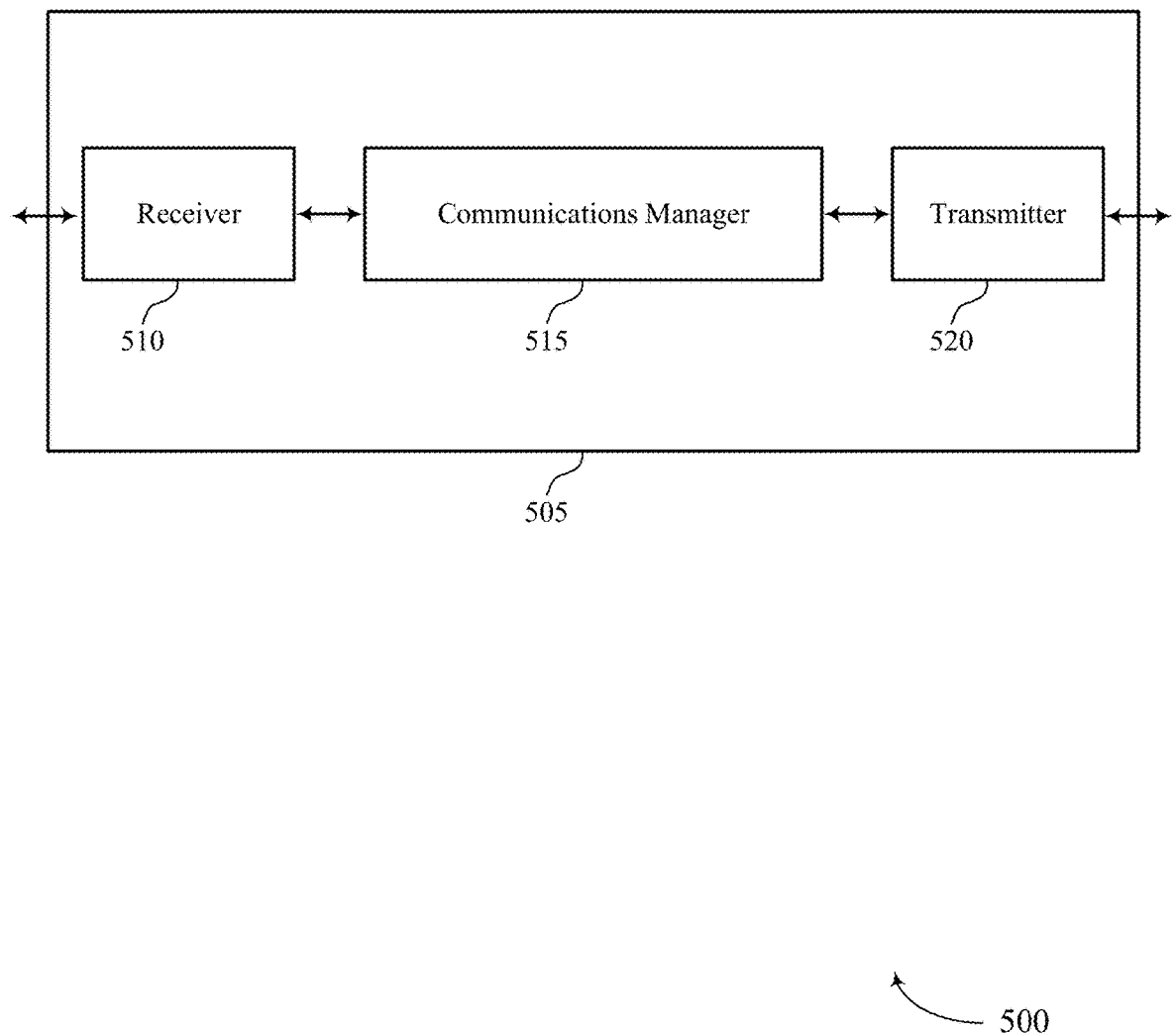
FIGS. 5 and 6 show block diagrams of devices that support dynamic bundling for feedback in accordance with aspects of the present disclosure.

FIG. 5 shows a block diagram 500 of a device 505 that supports dynamic bundling for feedback in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to dynamic bundling for feedback, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may receive, from a base station, a DCI message including an indicator that dynamically indicates bundling of one or more feedback messages, determine, based on the indicator, a bundled feedback from a set of feedback messages corresponding to a set of downlink data messages, the bundled feedback including fewer feedback bits than a number of feedback bits included in the set of feedback messages, and transmit the bundled feedback based on bundling being enabled by the indicator. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field programmable gate array (FPGA) or other programmable logic device (PLD), discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

In some example, the communications manager 515 may be implemented as an integrated circuit or shipset for a mobile device modem, and the receiver 510 and transmitter 520 may be implemented as analog components (e.g., amplifiers, filters, antennas) coupled with the mobile device modem to enable wireless transmission and reception over one or more bands.

The communications manager 515 as described herein may be implemented to realize one or more potential advantages. One implementation may allow the device 505 to experience power savings, such as reduced power consumption and extended battery life while ensuring reliable and efficient communications between the device 505 and the base station.

As such, the device 505 may improve the power consumption, spectral efficiency, higher data rates, and in some examples, may promote enhanced efficiency for high reliability and low latency operations, among other benefits for communication between device 505 and a base station.

Figure 6:
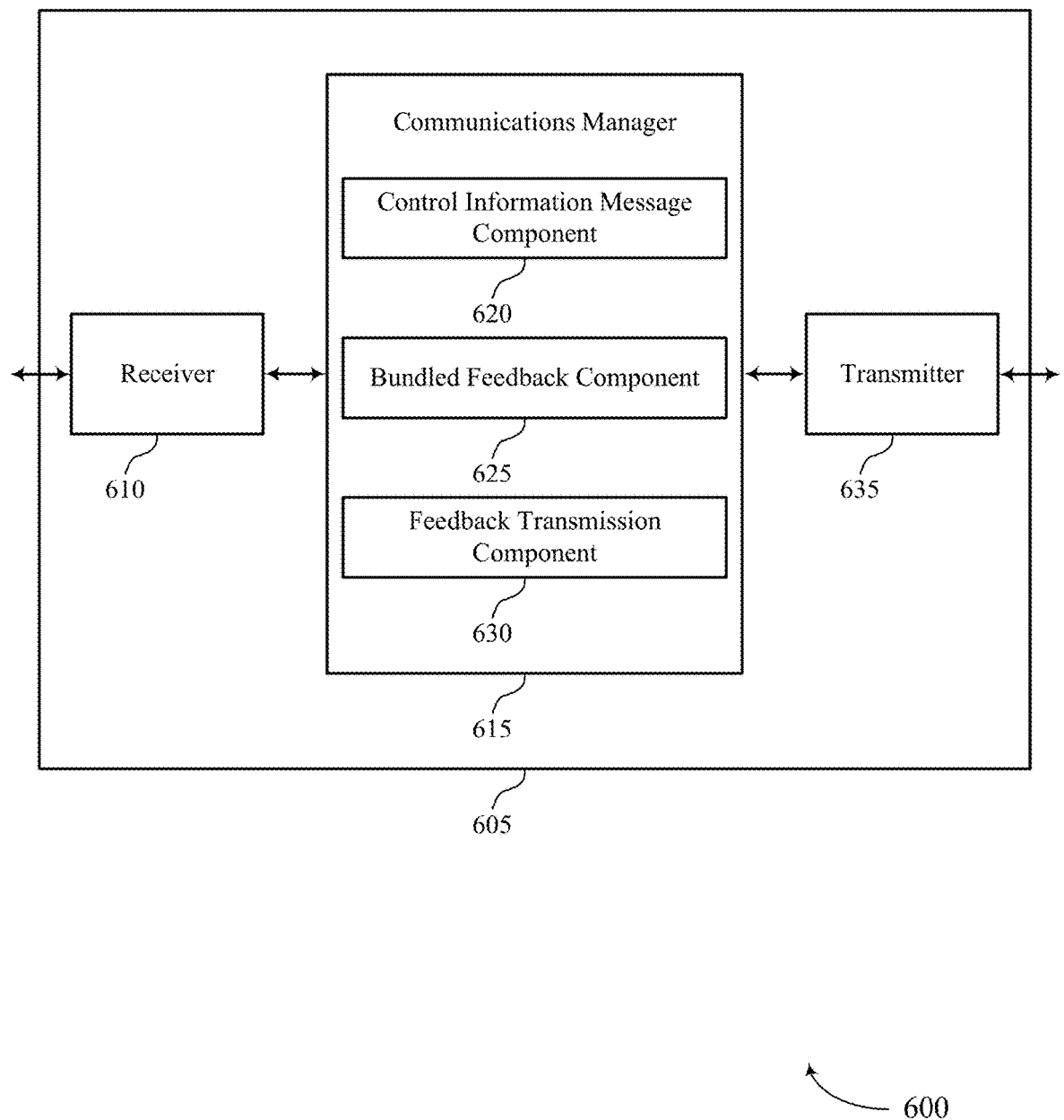

FIG. 6 shows a block diagram 600 of a device 605 that supports dynamic bundling for feedback in accordance with aspects of the present disclosure. The device 605 may be an example of aspects of a device 505, or a UE 115 as described herein. The device 605 may include a receiver 610, a communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to dynamic bundling for feedback, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a control information message component 620, a bundled feedback component 625, and a feedback transmission component 630. The communications manager 615 may be an example of aspects of the communications manager 810 described herein.

The control information message component 620 may receive, from a base station, a DCI message including an indicator that dynamically indicates bundling of one or more feedback messages. The bundled feedback component 625 may determine, based on the indicator, a bundled feedback from a set of feedback messages corresponding to a set of downlink data messages, the bundled feedback including fewer feedback bits than a number of feedback bits included in the set of feedback messages. The feedback transmission component 630 may transmit the bundled feedback based on bundling being enabled by the indicator.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

Figure 7:
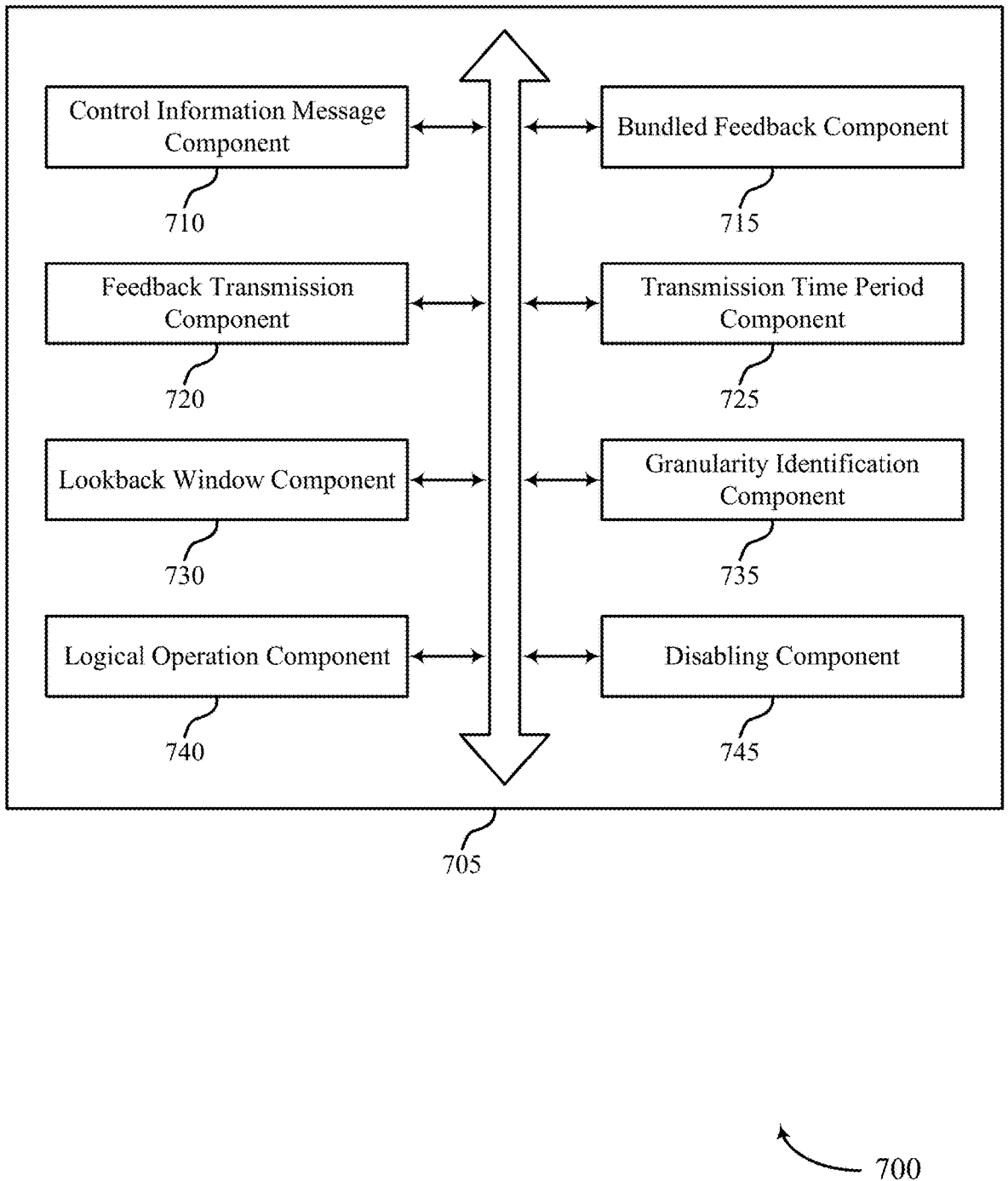
FIG. 7 shows a block diagram of a communications manager that supports dynamic bundling for feedback in accordance with aspects of the present disclosure.

FIG. 7 shows a block diagram 700 of a communications manager 705 that supports dynamic bundling for feedback in accordance with aspects of the present disclosure. The communications manager 705 may be an example of aspects of a communications manager 515, a communications manager 615, or a communications manager 810 described herein. The communications manager 705 may include a control information message component 710, a bundled feedback component 715, a feedback transmission component 720, a transmission time period component 725, a lookback window component 730, a granularity identification component 735, a logical operation component 740, and a disabling component 745. Each of these modules may communicate, directly or indirectly, with one another (e.g., via one or more buses).

The control information message component 710 may receive, from a base station, a DCI message including an indicator that dynamically indicates bundling of one or more feedback messages. In some cases, the indicator includes one bit.

The bundled feedback component 715 may determine, based on the indicator, a bundled feedback from a set of feedback messages corresponding to a set of downlink data messages, the bundled feedback including fewer feedback bits than a number of feedback bits included in the set of feedback messages. In some cases, the bundled feedback includes one feedback bit. The feedback transmission component 720 may transmit the bundled feedback based on bundling being enabled by the indicator.

In some examples, the control information message component 710 may receive, from the base station, a set of DCI messages. In some examples, the control information message component 710 may determine whether bundling is enabled based on the indicator included in a last-received DCI message of the set of DCI messages.

The transmission time period component 725 may identify a transmission time period allocated for transmission of the bundled feedback. The lookback window component 730 may identify a lookback time window that extends from the transmission time period to a prior time period, where the bundled feedback is for the set of feedback messages that would be transmitted during the lookback time window in an absence of bundling.

In some examples, the control information message component 710 may receive, from the base station, the DCI message including an indication to activate a sub-slot granularity. The granularity identification component 735 may identify a granularity of the lookback time window based on the activated sub-slot granularity.

In some examples, the control information message component 710 may determine that bundling is enabled until receiving a second DCI message including an indication to deactivate the sub-slot granularity. In some cases, a size of the lookback time window is proportional to the activated sub-slot granularity. In some cases, the sub-slot granularity includes a two orthogonal frequency division multiplexing symbol sub-slot granularity or a seven orthogonal frequency division multiplexing symbol sub-slot granularity.

The logical operation component 740 may perform a logical operation on the set of feedback messages to generate the bundled feedback. In some cases, the logical operation includes an AND operation.

In some examples, the control information message component 710 may receive, from the base station, a second DCI message including an indication that disables bundling of the one or more feedback messages. The disabling component 745 may disable bundling of the one or more feedback messages based on the indication.

Figure 8:
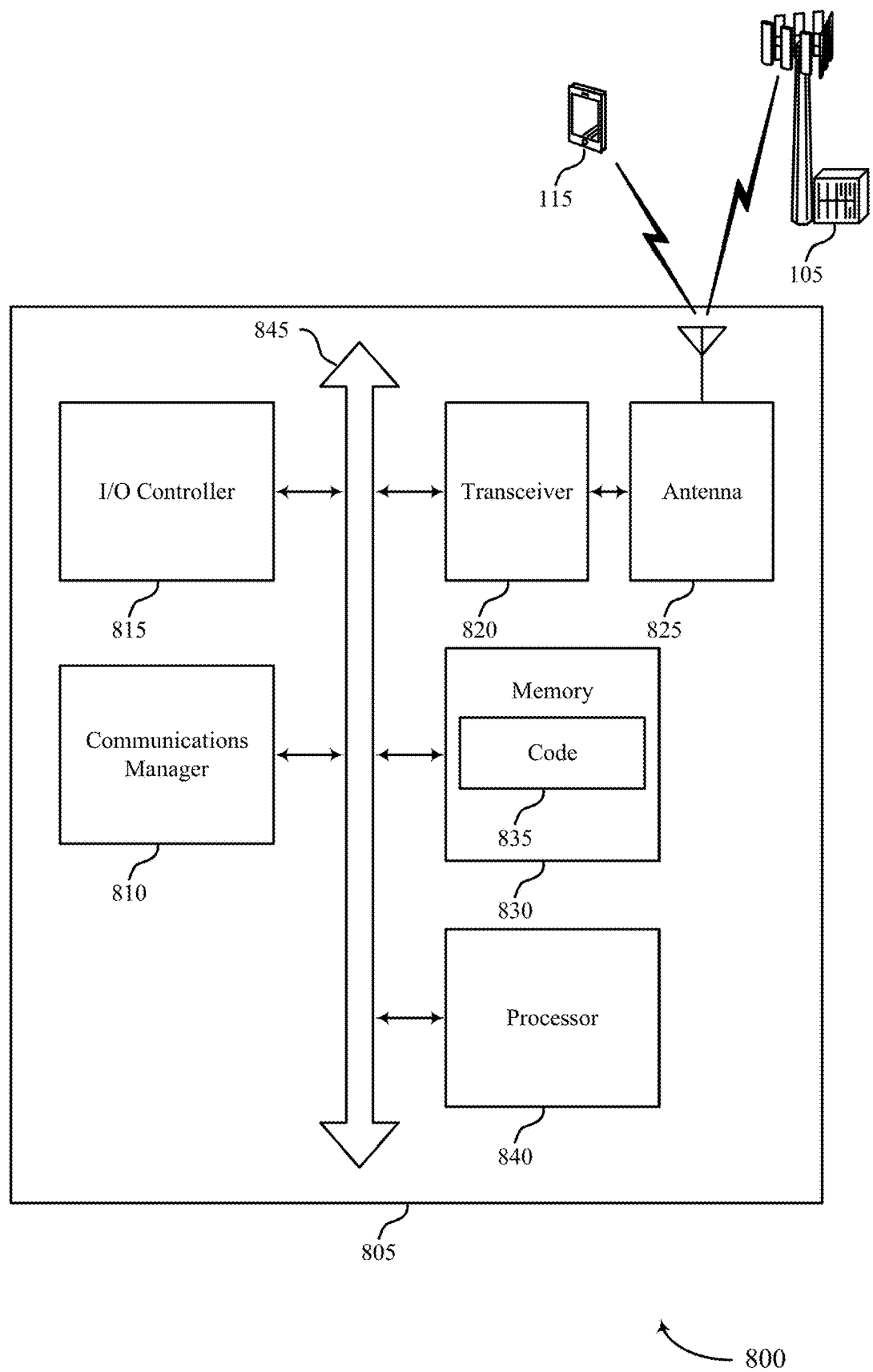
FIG. 8 shows a diagram of a system including a device that supports dynamic bundling for feedback in accordance with aspects of the present disclosure.

FIG. 8 shows a diagram of a system 800 including a device 805 that supports dynamic bundling for feedback in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive, from a base station, a DCI message including an indicator that dynamically indicates bundling of one or more feedback messages, determine, based on the indicator, a bundled feedback from a set of feedback messages corresponding to a set of downlink data messages, the bundled feedback including fewer feedback bits than a number of feedback bits included in the set of feedback messages, and transmit the bundled feedback based on bundling being enabled by the indicator.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described herein. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic input/output system (BIOS) which may control basic hardware or software operation such as the interaction with peripheral components or devices.

The processor 840 may include an intelligent hardware device, (e.g., a general-purpose processor, a DSP, a central processing unit (CPU), a microcontroller, an ASIC, an FPGA, a PLD, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting dynamic bundling for feedback).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
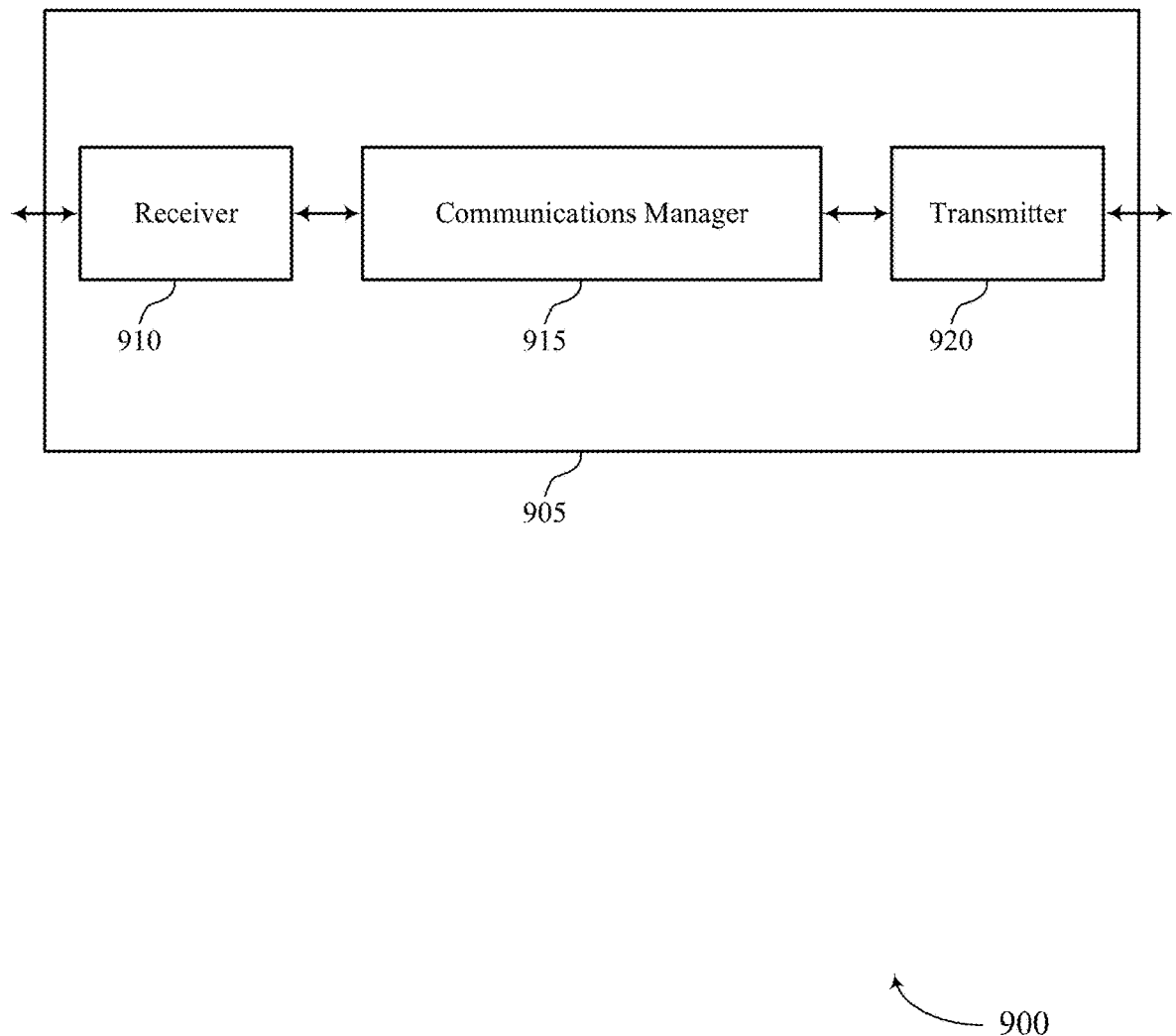
FIGS. 9 and 10 show block diagrams of devices that support dynamic bundling for feedback in accordance with aspects of the present disclosure.

FIG. 9 shows a block diagram 900 of a device 905 that supports dynamic bundling for feedback in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to dynamic bundling for feedback, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may transmit, to a UE, a DCI message including an indicator that dynamically indicates bundling of one or more feedback messages, transmit, to the UE, a set of downlink data messages, and receive, from the UE, a bundled feedback corresponding to the set of downlink data messages based on bundling being enabled by the indicator, the bundled feedback including fewer feedback bits than a number of feedback bits included in the set of feedback messages. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an ASIC, a FPGA or other PLD, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
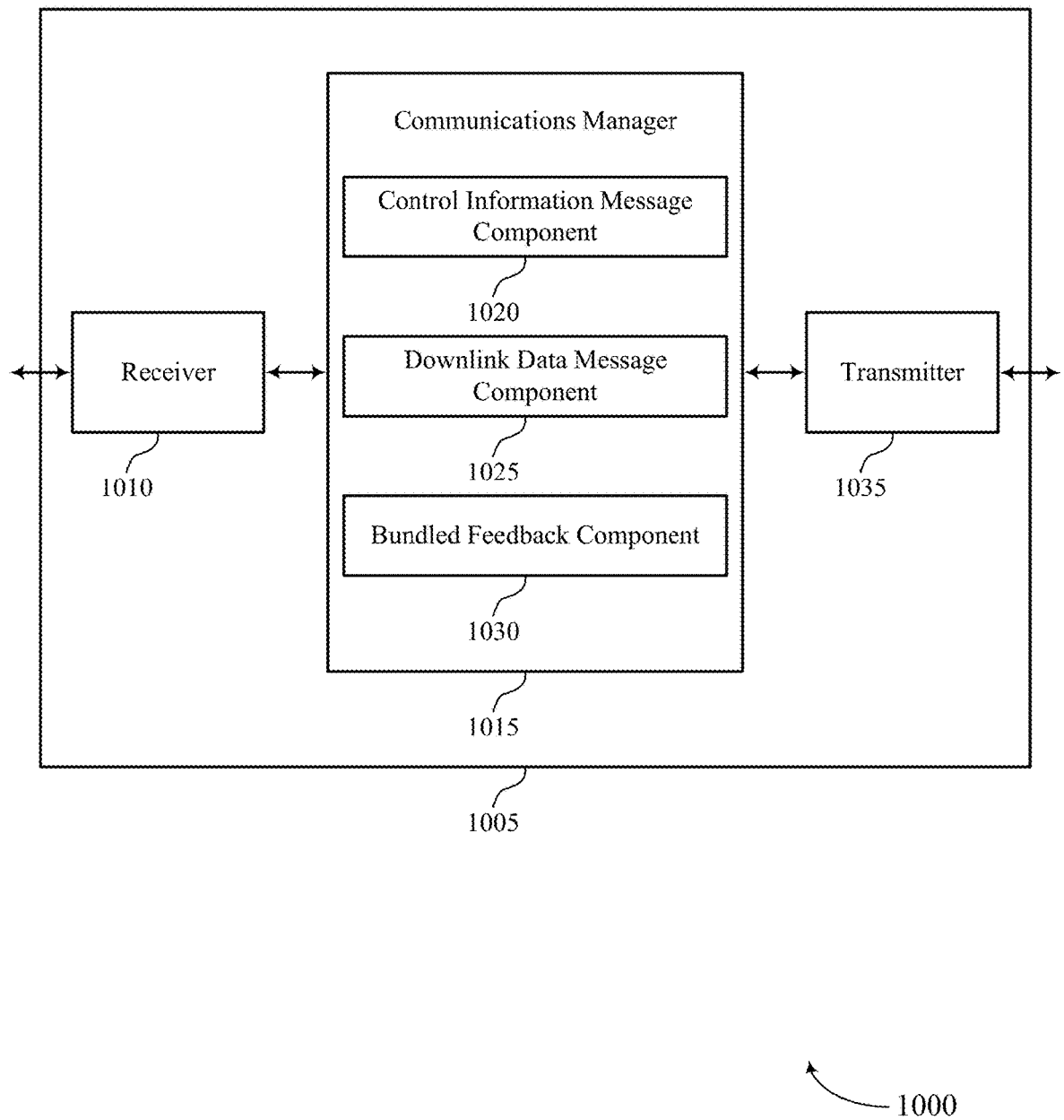

FIG. 10 shows a block diagram 1000 of a device 1005 that supports dynamic bundling for feedback in accordance with aspects of the present disclosure. The device 1005 may be an example of aspects of a device 905, or a base station 105 as described herein. The device 1005 may include a receiver 1010, a communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to dynamic bundling for feedback, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a control information message component 1020, a downlink data message component 1025, and a bundled feedback component 1030. The communications manager 1015 may be an example of aspects of the communications manager 1210 described herein.

The control information message component 1020 may transmit, to a UE, a DCI message including an indicator that dynamically indicates bundling of one or more feedback messages. The downlink data message component 1025 may transmit, to the UE, a set of downlink data messages. The bundled feedback component 1030 may receive, from the UE, a bundled feedback corresponding to the set of downlink data messages based on bundling being enabled by the indicator, the bundled feedback including fewer feedback bits than a number of feedback bits included in the set of feedback messages.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
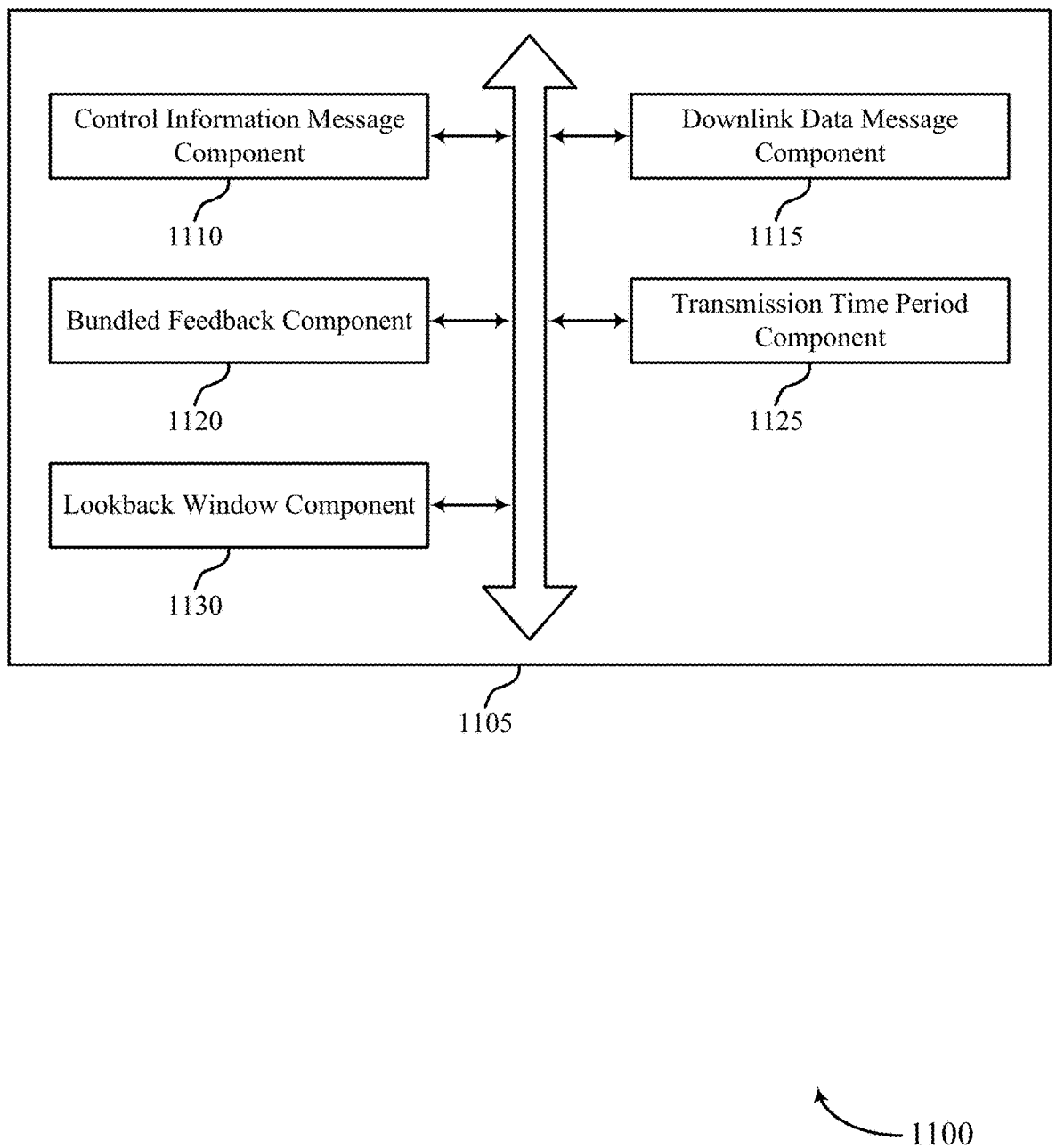
FIG. 11 shows a block diagram of a communications manager that supports dynamic bundling for feedback in accordance with aspects of the present disclosure.

FIG. 11 shows a block diagram 1100 of a communications manager 1105 that supports dynamic bundling for feedback in accordance with aspects of the present disclosure. The communications manager 1105 may be an example of aspects of a communications manager 915, a communications manager 1015, or a communications manager 1210 described herein. The communications manager 1105 may include a control information message component 1110, a downlink data message component 1115, a bundled feedback component 1120, a transmission time period component 1125, and a lookback window component 1130. Each of these modules may communicate, directly or indirectly, with one another (e.g., via one or more buses).

The control information message component 1110 may transmit, to a UE, a DCI message including an indicator that dynamically indicates bundling of one or more feedback messages. In some cases, the indicator includes one bit.

The downlink data message component 1115 may transmit, to the UE, a set of downlink data messages. The bundled feedback component 1120 may receive, from the UE, a bundled feedback corresponding to the set of downlink data messages based on bundling being enabled by the indicator, the bundled feedback including fewer feedback bits than a number of feedback bits included in the set of feedback messages. In some cases, the bundled feedback includes one feedback bit.

The transmission time period component 1125 may identify a transmission time period allocated for transmission of the bundled feedback. The lookback window component 1130 may identify a lookback time window that extends from the transmission time period to a prior time period, where the bundled feedback is for the set of feedback messages that would be transmitted during the lookback time window in an absence of bundling.

In some examples, the control information message component 1110 may transmit, to the UE, the DCI message including an indication to activate a sub-slot granularity, where a granularity of the lookback time window is based on the activated sub-slot granularity.

In some cases, a size of the lookback time window is proportional to the activated sub-slot granularity. In some cases, the sub-slot granularity includes a two orthogonal frequency division multiplexing symbol sub-slot granularity or a seven orthogonal frequency division multiplexing symbol sub-slot granularity.

In some cases, the bundled feedback is generated based on performing a logical operation on the set of feedback messages. In some cases, the logical operation includes an AND operation.

In some examples, the control information message component 1110 may transmit, to the UE, a second DCI message including an indication that disables bundling of the one or more feedback messages.

Figure 12:
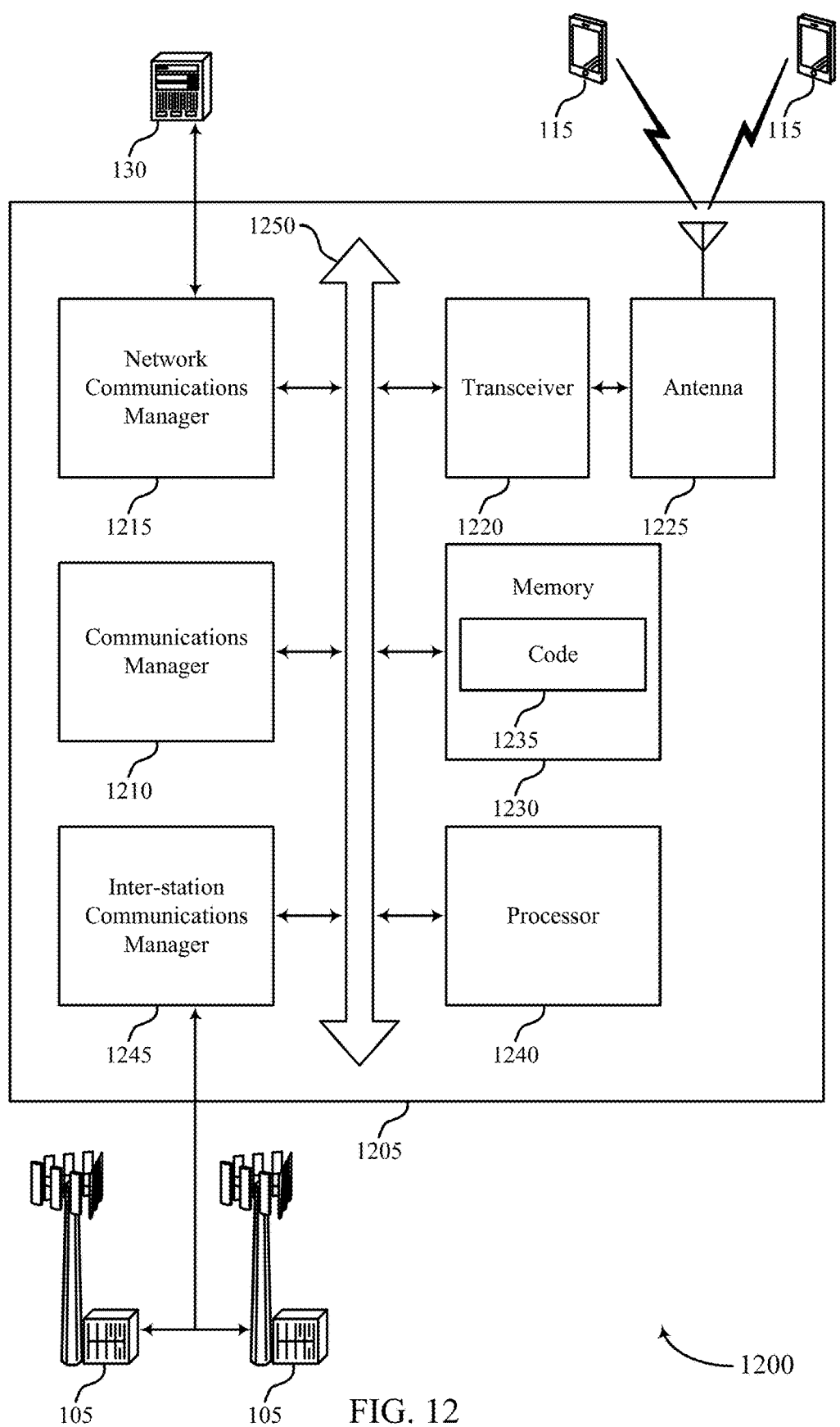
FIG. 12 shows a diagram of a system including a device that supports dynamic bundling for feedback in accordance with aspects of the present disclosure.

FIG. 12 shows a diagram of a system 1200 including a device 1205 that supports dynamic bundling for feedback in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may transmit, to a UE, a DCI message including an indicator that dynamically indicates bundling of one or more feedback messages, transmit, to the UE, a set of downlink data messages, and receive, from the UE, a bundled feedback corresponding to the set of downlink data messages based on bundling being enabled by the indicator, the bundled feedback including fewer feedback bits than a number of feedback bits included in the set of feedback messages.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described herein. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting dynamic bundling for feedback).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
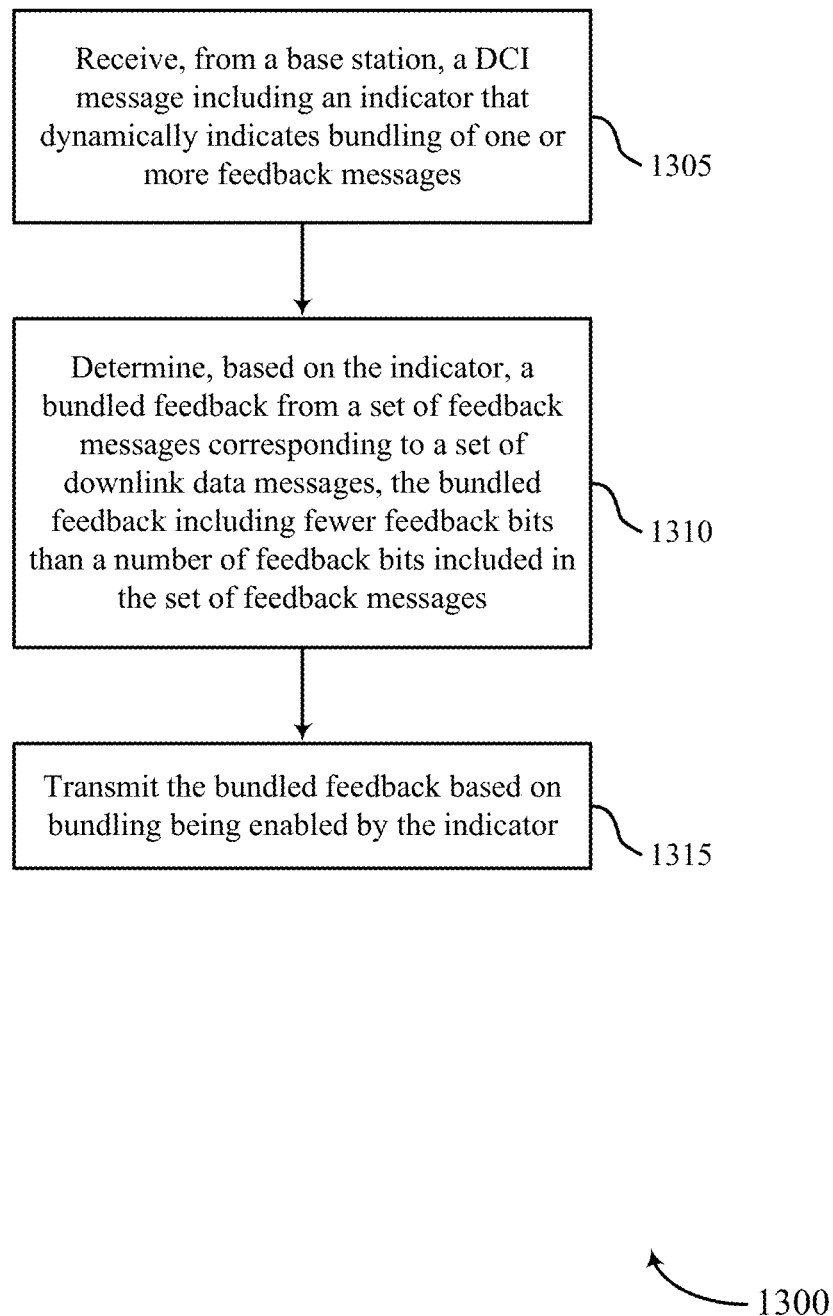
FIGS. 13 through 16 show flowcharts illustrating methods that support dynamic bundling for feedback in accordance with aspects of the present disclosure.

FIG. 13 shows a flowchart illustrating a method 1300 that supports dynamic bundling for feedback in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1305, the UE may receive, from a base station, a DCI message including an indicator that dynamically indicates bundling of one or more feedback messages. The operations of 1305 may be performed according to the methods described herein. In some examples, aspects of the operations of 1305 may be performed by a control information message component as described with reference to FIGS. 5 through 8.

At 1310, the UE may determine, based on the indicator, a bundled feedback from a set of feedback messages corresponding to a set of downlink data messages, the bundled feedback including fewer feedback bits than a number of feedback bits included in the set of feedback messages. The operations of 1310 may be performed according to the methods described herein. In some examples, aspects of the operations of 1310 may be performed by a bundled feedback component as described with reference to FIGS. 5 through 8.

At 1315, the UE may transmit the bundled feedback based on bundling being enabled by the indicator. The operations of 1315 may be performed according to the methods described herein. In some examples, aspects of the operations of 1315 may be performed by a feedback transmission component as described with reference to FIGS. 5 through 8.

Figure 14:
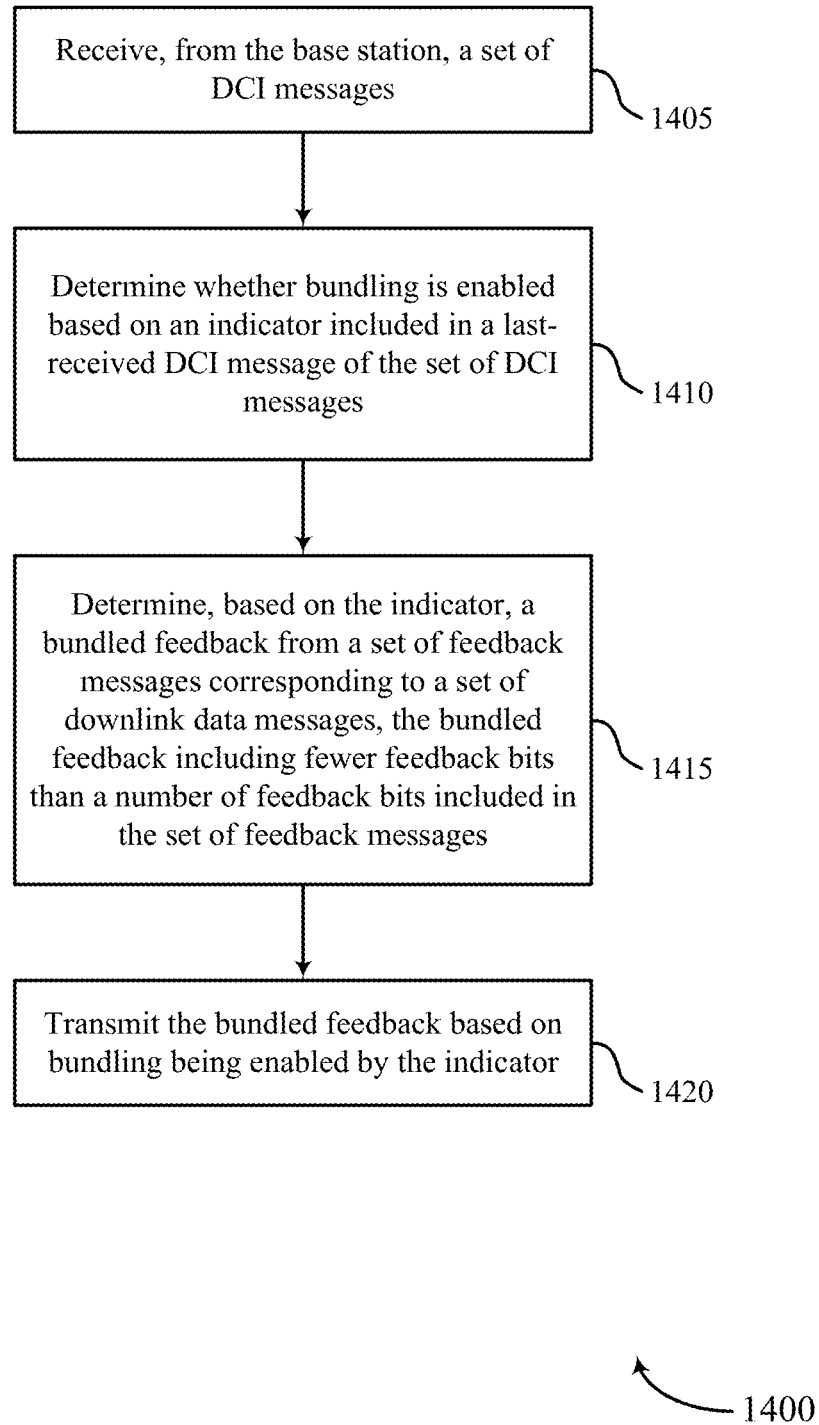

FIG. 14 shows a flowchart illustrating a method 1400 that supports dynamic bundling for feedback in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1405, the UE may receive, from the base station, a set of DCI messages. The operations of 1405 may be performed according to the methods described herein. In some examples, aspects of the operations of 1405 may be performed by a control information message component as described with reference to FIGS. 5 through 8.

At 1410, the UE may determine whether bundling is enabled based on an indicator included in a last-received DCI message of the set of DCI messages. The operations of 1410 may be performed according to the methods described herein. In some examples, aspects of the operations of 1410 may be performed by a control information message component as described with reference to FIGS. 5 through 8.

At 1415, the UE may determine, based on the indicator, a bundled feedback from a set of feedback messages corresponding to a set of downlink data messages, the bundled feedback including fewer feedback bits than a number of feedback bits included in the set of feedback messages. The operations of 1415 may be performed according to the methods described herein. In some examples, aspects of the operations of 1415 may be performed by a bundled feedback component as described with reference to FIGS. 5 through 8.

At 1420, the UE may transmit the bundled feedback based on bundling being enabled by the indicator. The operations of 1420 may be performed according to the methods described herein. In some examples, aspects of the operations of 1420 may be performed by a feedback transmission component as described with reference to FIGS. 5 through 8.

Figure 15:
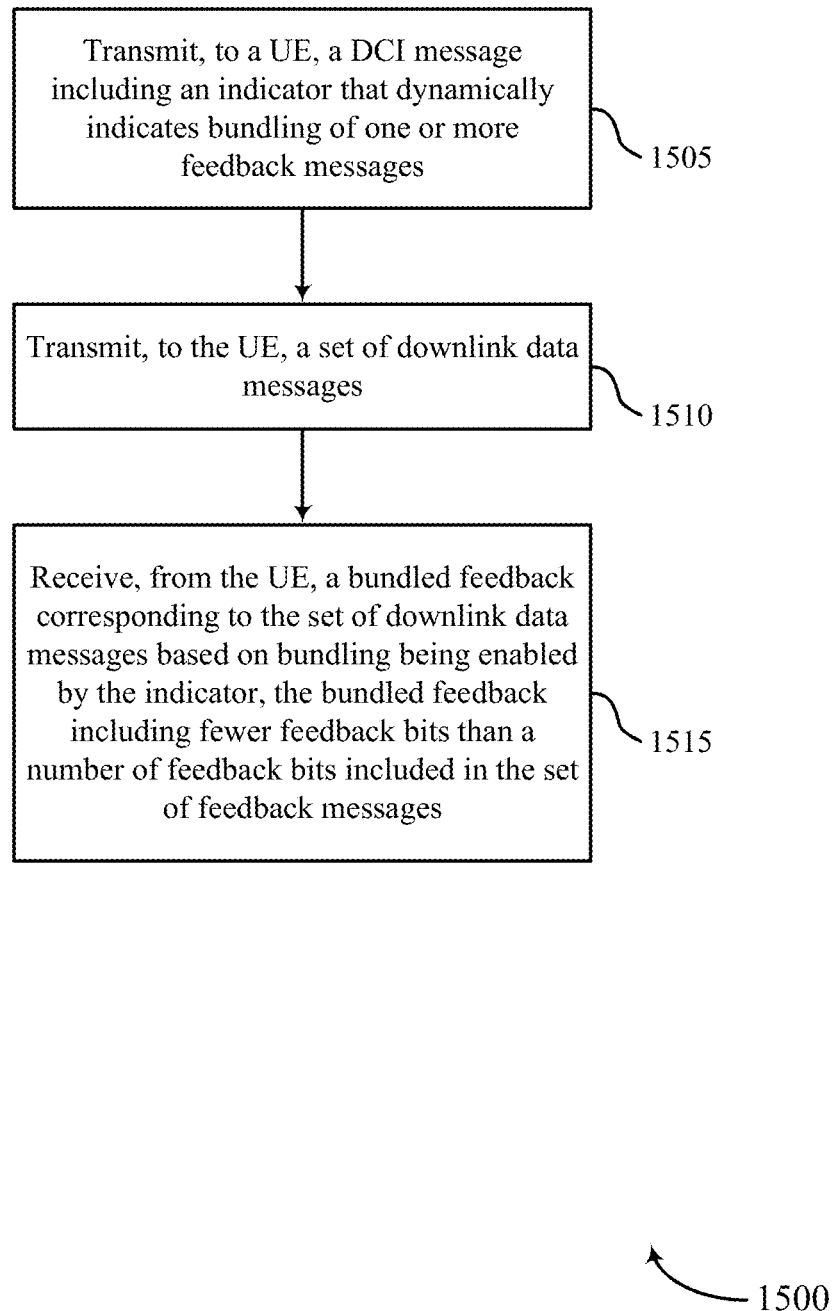

FIG. 15 shows a flowchart illustrating a method 1500 that supports dynamic bundling for feedback in accordance with aspects of the present disclosure. The operations of method 1500 may be implemented by a base station 105 or its components as described herein. For example, the operations of method 1500 may be performed by a communications manager as described with reference to FIGS. 9 through 12. In some examples, a base station may execute a set of instructions to control the functional elements of the base station to perform the functions described herein. Additionally or alternatively, a base station may perform aspects of the functions described herein using special-purpose hardware.

At 1505, the base station may transmit, to a UE, a DCI message including an indicator that dynamically indicates bundling of one or more feedback messages. The operations of 1505 may be performed according to the methods described herein. In some examples, aspects of the operations of 1505 may be performed by a control information message component as described with reference to FIGS. 9 through 12.

At 1510, the base station may transmit, to the UE, a set of downlink data messages. The operations of 1510 may be performed according to the methods described herein. In some examples, aspects of the operations of 1510 may be performed by a downlink data message component as described with reference to FIGS. 9 through 12.

At 1515, the base station may receive, from the UE, a bundled feedback corresponding to the set of downlink data messages based on bundling being enabled by the indicator, the bundled feedback including fewer feedback bits than a number of feedback bits included in the set of feedback messages. The operations of 1515 may be performed according to the methods described herein. In some examples, aspects of the operations of 1515 may be performed by a bundled feedback component as described with reference to FIGS. 9 through 12.

Figure 16:
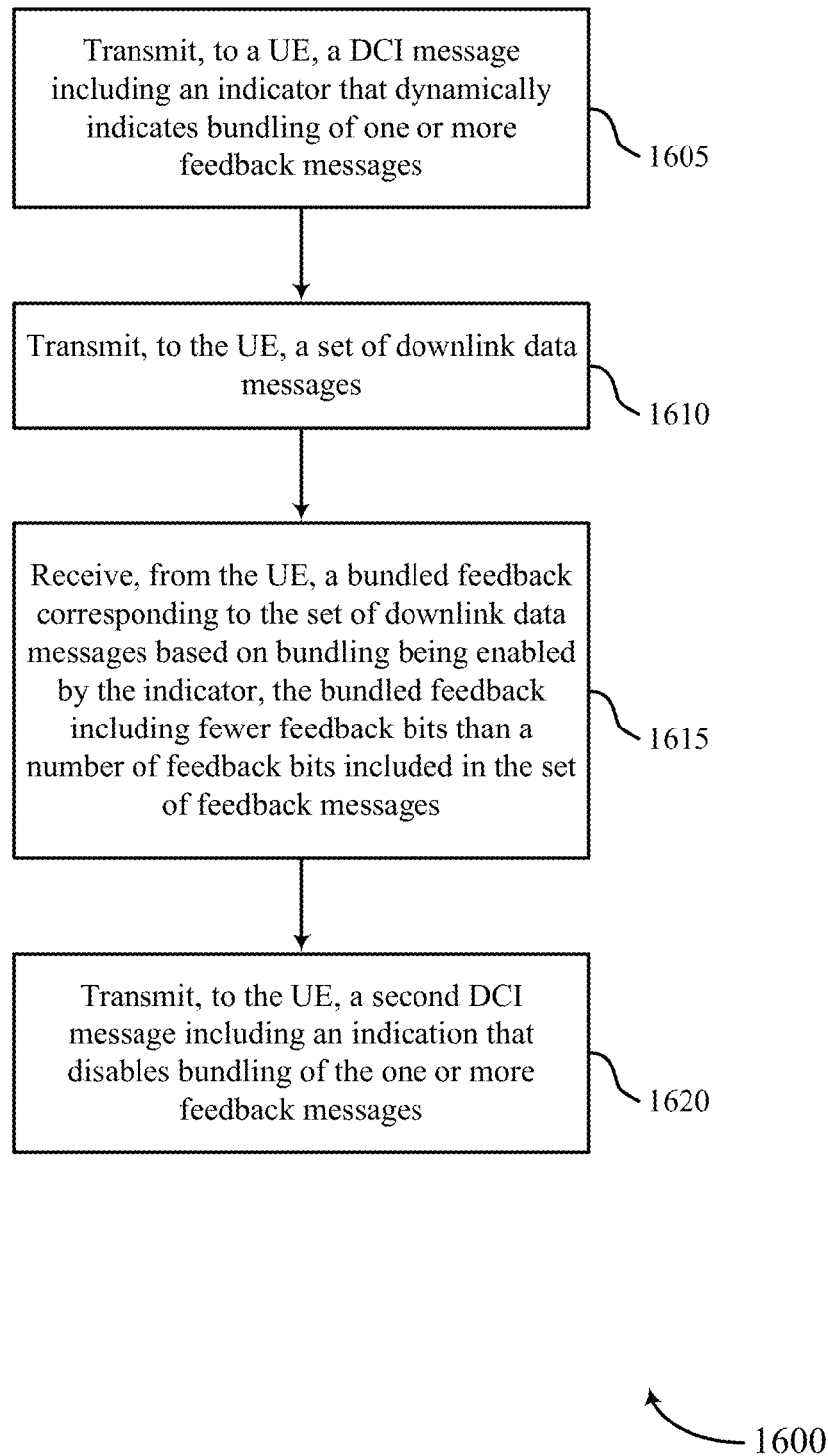

FIG. 16 shows a flowchart illustrating a method 1600 that supports dynamic bundling for feedback in accordance with aspects of the present disclosure. The operations of method 1600 may be implemented by a base station 105 or its components as described herein. For example, the operations of method 1600 may be performed by a communications manager as described with reference to FIGS. 9 through 12. In some examples, a base station may execute a set of instructions to control the functional elements of the base station to perform the functions described herein. Additionally or alternatively, a base station may perform aspects of the functions described herein using special-purpose hardware.

At 1605, the base station may transmit, to a UE, a DCI message including an indicator that dynamically indicates bundling of one or more feedback messages. The operations of 1605 may be performed according to the methods described herein. In some examples, aspects of the operations of 1605 may be performed by a control information message component as described with reference to FIGS. 9 through 12.

At 1610, the base station may transmit, to the UE, a set of downlink data messages. The operations of 1610 may be performed according to the methods described herein. In some examples, aspects of the operations of 1610 may be performed by a downlink data message component as described with reference to FIGS. 9 through 12.

At 1615, the base station may receive, from the UE, a bundled feedback corresponding to the set of downlink data messages based on bundling being enabled by the indicator, the bundled feedback including fewer feedback bits than a number of feedback bits included in the set of feedback messages. The operations of 1615 may be performed according to the methods described herein. In some examples, aspects of the operations of 1615 may be performed by a bundled feedback component as described with reference to FIGS. 9 through 12.

At 1620, the base station may transmit, to the UE, a second DCI message including an indication that disables bundling of the one or more feedback messages. The operations of 1620 may be performed according to the methods described herein. In some examples, aspects of the operations of 1620 may be performed by a control information message component as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method of wireless communication at a UE, comprising: receiving, from a base station, a DCI message comprising an indicator that dynamically indicates bundling of one or more feedback messages; determining, based at least in part on the indicator, a bundled feedback from a plurality of feedback messages corresponding to a plurality of downlink data messages, the bundled feedback comprising fewer feedback bits than a number of feedback bits included in the plurality of feedback messages; and transmitting the bundled feedback based at least in part on bundling being enabled by the indicator.

Aspect 2: The method of aspect 1, wherein receiving the DCI message comprising the indicator further comprises: receiving, from the base station, a plurality of DCI messages; and determining whether bundling is enabled based at least in part on the indicator included in a last-received DCI message of the plurality of DCI messages.

Aspect 3: The method of any of aspect 1 through 2, further comprising: identifying a transmission time period allocated for transmission of the bundled feedback; and identifying a lookback time window that extends from the transmission time period to a prior time period, wherein the bundled feedback is for the plurality of feedback messages that would be transmitted during the lookback time window in an absence of bundling.

Aspect 4: The method of any of aspects 1 through 3, wherein receiving the DCI message comprising the indicator further comprises: receiving, from the base station, the DCI message comprising an indication to activate a sub-slot granularity; and identifying a granularity of the lookback time window based at least in part on the activated sub-slot granularity.

Aspect 5: The method of any of aspects 1 through 4, further comprising: determining that bundling is enabled until receiving a second DCI message comprising an indication to deactivate the sub-slot granularity.

Aspect 6: The method of any of aspects 1 through 5, wherein a size of the lookback time window is proportional to the activated sub-slot granularity.

Aspect 7: The method of any of aspects 1 through 6, wherein the sub-slot granularity comprises a two orthogonal frequency division multiplexing symbol sub-slot granularity or a seven orthogonal frequency division multiplexing symbol sub-slot granularity.

Aspect 8: The method of any of aspects 1 through 7, further comprising: performing a logical operation on the plurality of feedback messages to generate the bundled feedback.

Aspect 9: The method of any of aspects 1 through 8, wherein the logical operation comprises an AND operation.

Aspect 10: The method of any of aspects 1 through 9, further comprising: receiving, from the base station, a second DCI message comprising an indication that disables bundling of the one or more feedback messages; and disabling bundling of the one or more feedback messages based at least in part on the indication.

Aspect 11: The method of any of aspects 1 through 10, wherein the bundled feedback comprises one feedback bit.

Aspect 12: The method of any of aspects 1 through 11, wherein the indicator comprises one bit.

Aspect 13: The method of any of aspects 1 through 12, wherein the bundled feedback comprises a HARQ feedback for the plurality of downlink data messages.

Aspect 14: An apparatus comprising at least one means for performing a method of any of aspects 1 through 13.

Aspect 15: An apparatus for wireless communications comprising a processor; memory coupled with the processor; and instructions stored in the memory and executable by the processor to cause the apparatus to perform a method of any of aspects 1 through 13.

Aspect 16: A non-transitory computer-readable medium storing code for wireless communications, the code comprising instructions executable by a processor to perform a method of any of aspect 1 through 13.

Aspect 17: A method of wireless communication at a base station, comprising: transmitting, to a UE, a DCI message comprising an indicator that dynamically indicates bundling of one or more feedback messages; transmitting, to the UE, a plurality of downlink data messages; and receiving, from the UE, a bundled feedback corresponding to a plurality of feedback messages for the plurality of downlink data messages based at least in part on bundling being enabled by the indicator, the bundled feedback comprising fewer feedback bits than a number of feedback bits included in the plurality of feedback messages.

Aspect 18: The method of aspect 17, further comprising: identifying a transmission time period allocated for transmission of the bundled feedback; and identifying a lookback time window that extends from the transmission time period to a prior time period, wherein the bundled feedback is for the plurality of feedback messages that would be transmitted during the lookback time window in an absence of bundling.

Aspect 19: The method of any of aspects 17 through 18, wherein transmitting the DCI message comprising the indicator further comprises: transmitting, to the UE, the DCI message comprising an indication to activate a sub-slot granularity, wherein a granularity of the lookback time window is based at least in part on the activated sub-slot granularity.

Aspect 20: The method of any of aspects 17 through 19, wherein a size of the lookback time window is proportional to the activated sub-slot granularity.

Aspect 21: The method of any of aspects 17 through 20, wherein the sub-slot granularity comprises a two orthogonal frequency division multiplexing symbol sub-slot granularity or a seven orthogonal frequency division multiplexing symbol sub-slot granularity.

Aspect 22: The method of any of aspects 17 through 21, wherein the bundled feedback is generated based at least in part on performing a logical operation on the plurality of feedback messages.

Aspect 23: The method of any of aspects 17 to 22, wherein the logical operation comprises an AND operation.

Aspect 24: The method of any of aspects 17 through 23, further comprising: transmitting, to the UE, a second DCI message comprising an indication that disables bundling of the one or more feedback messages.

Aspect 25: The method of any of aspects 17 through 24, wherein the bundled feedback comprises one feedback bit.

Aspect 26: The method of any of aspects 17 through 25, wherein the indicator comprises one bit.

Aspect 27: The method of any of aspects 17 through 26, wherein the bundling feedback comprises a HARQ feedback for the plurality of downlink data messages.

Aspect 28: An apparatus comprising at least one means for performing a method of any of aspects 17 to 27.

Aspect 29: An apparatus for wireless communications comprising a processor; memory coupled with the processor; and instructions stored in the memory and executable by the processor to cause the apparatus to perform a method of any of aspects 17 to 27.

Aspect 30: A non-transitory computer-readable medium storing code for wireless communications, the code comprising instructions executable by a processor to perform a method of any of aspects 17 to 27.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other PLD, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    receiving, from a network device, a downlink control information message that schedules one or more downlink data messages and that comprises an indicator that dynamically indicates whether bundling of one or more feedback messages corresponding to the one or more downlink data messages is enabled or is not enabled;
    determining, based at least in part on the indicator, a bundled feedback from a plurality of feedback messages corresponding to a plurality of downlink data messages from the network device, the bundled feedback comprising fewer feedback bits than a quantity of feedback bits included in the plurality of feedback messages; and
    transmitting the bundled feedback to the network device during a transmission time period based at least in part on bundling being enabled by the indicator, wherein the bundled feedback is for the plurality of downlink data messages received during a lookback time window, wherein the lookback time window extends from the transmission time period to a prior time period, and wherein a granularity of the lookback time window is based at least in part on a dynamically activated sub-slot granularity.

2. The method of claim 1, wherein receiving the downlink control information message comprising the indicator further comprises:
    receiving, from the network device, a plurality of downlink control information messages; and
    determining whether bundling is enabled based at least in part on the indicator included in a last-received downlink control information message of the plurality of downlink control information messages.

3. The method of claim 1, wherein receiving the downlink control information message comprising the indicator further comprises:
    receiving, from the network device, the downlink control information message comprising an indication to activate the sub-slot granularity; and
    identifying the granularity of the lookback time window based at least in part on the dynamically activated sub-slot granularity.

4. The method of claim 3, further comprising:
    determining that bundling is enabled until receiving a second downlink control information message comprising an indication to deactivate the sub-slot granularity.

5. The method of claim 1, wherein a size of the lookback time window is proportional to the dynamically activated sub-slot granularity.

6. The method of claim 1, wherein the dynamically activated sub-slot granularity comprises a two orthogonal frequency division multiplexing symbol sub-slot granularity or a seven orthogonal frequency division multiplexing symbol sub-slot granularity.

7. The method of claim 1, further comprising:
    performing a logical operation on the plurality of feedback messages to generate the bundled feedback.

8. The method of claim 7, wherein the logical operation comprises an AND operation.

9. The method of claim 1, further comprising:
    receiving, from the network device, a second downlink control information message comprising an indication that disables bundling of the one or more feedback messages; and
    disabling bundling of the one or more feedback messages based at least in part on the indication.

10. The method of claim 1, wherein the bundled feedback comprises one feedback bit.

11. The method of claim 1, wherein the indicator comprises one bit.

12. The method of claim 1, wherein the bundled feedback comprises a hybrid automatic repeat request feedback for the plurality of downlink data messages.

13. A method for wireless communication at a network device, comprising:
   transmitting, to a user equipment (UE), a downlink control information message that schedules one or more downlink data messages and that comprises an indicator that dynamically indicates whether bundling of one or more feedback messages corresponding to the one or more downlink data messages is enabled or is not enabled;
   transmitting, to the UE, a plurality of downlink data messages; and
   receiving, from the UE and during a transmission time period, a bundled feedback corresponding to a plurality of feedback messages for the plurality of downlink data messages based at least in part on bundling being enabled by the indicator, the bundled feedback comprising fewer feedback bits than a quantity of feedback bits included in the plurality of feedback messages, wherein the bundled feedback is for the plurality of downlink data messages received during a lookback time window, wherein the lookback time window extends from the transmission time period to a prior time period, and wherein a granularity of the lookback time window is based at least in part on a dynamically activated sub-slot granularity.

14. The method of claim 13, wherein transmitting the downlink control information message comprising the indicator further comprises:
   transmitting, to the UE, the downlink control information message comprising an indication to activate the sub-slot granularity.

15. The method of claim 13, wherein a size of the lookback time window is proportional to the dynamically activated sub-slot granularity.

16. The method of claim 13, wherein the dynamically activated sub-slot granularity comprises a two orthogonal frequency division multiplexing symbol sub-slot granularity or a seven orthogonal frequency division multiplexing symbol sub-slot granularity.

17. The method of claim 13, wherein the bundled feedback is generated based at least in part on performing a logical operation on the plurality of feedback messages.

18. The method of claim 17, wherein the logical operation comprises an AND operation.

19. The method of claim 13, further comprising:
   transmitting, to the UE, a second downlink control information message comprising an indication that disables bundling of the one or more feedback messages.

20. The method of claim 13, wherein the bundled feedback comprises one feedback bit.

21. The method of claim 13, wherein the indicator comprises one bit.

22. The method of claim 13, wherein the bundled feedback comprises a hybrid automatic repeat request feedback for the plurality of downlink data messages.

23. An apparatus for wireless communication at a user equipment (UE), comprising:
   a processor,
   memory coupled with the processor; and
   instructions stored in the memory and executable by the processor to cause the apparatus to:
      receive, from a network device, a downlink control information message that schedules one or more downlink data messages and that comprises an indicator that dynamically indicates whether bundling of one or more feedback messages corresponding to the one or more downlink data messages is enabled or is not enabled;
      determine, based at least in part on the indicator, a bundled feedback from a plurality of feedback messages corresponding to a plurality of downlink data messages from the network device, the bundled feedback comprising fewer feedback bits than a quantity of feedback bits included in the plurality of feedback messages; and
      transmit the bundled feedback to the network device during a transmission time period based at least in part on bundling being enabled by the indicator, wherein the bundled feedback is for the plurality of downlink data messages received during a lookback time window, wherein the lookback time window extends from the transmission time period to a prior time period, and wherein a granularity of the lookback time window is based at least in part on a dynamically activated sub-slot granularity.

24. The apparatus of claim 23, wherein, to receive the downlink control information message comprising the indicator, the instructions are further executable by the processor to cause the apparatus to:
   receive, from the network device, a plurality of downlink control information messages; and
   determine whether bundling is enabled based at least in part on the indicator included in a last-received downlink control information message of the plurality of downlink control information messages.

25. The apparatus of claim 23, wherein, to receive the downlink control information message comprising the indicator, the instructions are further executable by the processor to cause the apparatus to:
   receive, from the network device, the downlink control information message comprising an indication to activate the sub-slot granularity; and
   identify the granularity of the lookback time window based at least in part on the dynamically activated sub-slot granularity.

26. The apparatus of claim 25, wherein the instructions are further executable by the processor to cause the apparatus to:
   determine that bundling is enabled until receiving a second downlink control information message comprising an indication to deactivate the sub-slot granularity.

27. The apparatus of claim 23, wherein a size of the lookback time window is proportional to the dynamically activated sub-slot granularity.

28. The apparatus of claim 23, wherein the dynamically activated sub-slot granularity comprises a two orthogonal frequency division multiplexing symbol sub-slot granularity or a seven orthogonal frequency division multiplexing symbol sub-slot granularity.

29. An apparatus for wireless communication at a network device, comprising:
   a processor,
   memory coupled with the processor; and
   instructions stored in the memory and executable by the processor to cause the apparatus to:

transmit, to a user equipment (UE), a downlink control information message that schedules one or more downlink data messages and that comprises an indicator that dynamically indicates whether bundling of one or more feedback messages corresponding to the one or more downlink data messages is enabled or is not enabled;

transmit, to the UE, a plurality of downlink data messages; and receive, from the UE and during a transmission time period, a bundled feedback corresponding to a plurality of feedback messages for the plurality of downlink data messages based at least in part on bundling being enabled by the indicator, the bundled feedback comprising fewer feedback bits than a quantity of feedback bits included in the plurality of feedback messages, wherein the bundled feedback is for the plurality of downlink data messages received during a lookback time window, wherein the lookback time window extends from the transmission time period to a prior time period, and wherein a granularity of the lookback time window is based at least in part on a dynamically activated sub-slot granularity.

30. The apparatus of claim 29, wherein, to transmit the downlink control information message comprising the indicator, the instructions are further executable by the processor to cause the apparatus to:

transmit, to the UE, the downlink control information message comprising an indication to activate the sub-slot granularity.

* * * * *